US012684623B2

(12) United States Patent
Chin et al.

(10) Patent No.: US 12,684,623 B2
(45) Date of Patent: Jul. 14, 2026

(54) USER EQUIPMENT AND METHOD FOR SMALL DATA TRANSMISSION

(71) Applicant: SHARP KABUSHIKI KAISHA, Sakai City (JP)

(72) Inventors: Heng-Li Chin, Taipei (TW); Hsin-Hsi Tsai, Taipei (TW); Yung-Lan Tseng, Taipei (TW); Hai-Han Wang, Taipei (TW); Chia-Hung Wei, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 1108 days.

(21) Appl. No.: 17/735,654

(22) Filed: May 3, 2022

(65) Prior Publication Data

US 2022/0377800 A1 Nov. 24, 2022

Related U.S. Application Data

(60) Provisional application No. 63/184,031, filed on May 4, 2021.

(51) Int. Cl.
*H04W 74/0833* (2024.01)
*H04W 72/21* (2023.01)
(Continued)

(52) U.S. Cl.
CPC ....... *H04W 74/0833* (2013.01); *H04W 72/21* (2023.01); *H04W 72/23* (2023.01); *H04W 74/0836* (2024.01)

(58) Field of Classification Search
CPC .. H04W 74/0833; H04W 72/21; H04W 72/23
(Continued)

(56) References Cited

U.S. PATENT DOCUMENTS

2019/0289661 A1* 9/2019 Chen ..................... H04W 76/27
2023/0371079 A1* 11/2023 Wang ................ H04W 72/0453
(Continued)

OTHER PUBLICATIONS

3GPP TS 38.300, "3rd Generation Partnership Project; Technical Specification Group Radio Access Network; NR; NR and NG-RAN Overall Description; Stage 2 (Release 16)", Technical Specification, V16.2.0 (Jul. 2020).
(Continued)

*Primary Examiner* — Chi Tang P Cheng
(74) *Attorney, Agent, or Firm* — ScienBiziP, P.C.

(57) ABSTRACT

A user equipment (UE) and a method for small data transmission (SDT) are provided. The method includes initiating an SDT procedure while the UE is in a Radio Resource Control (RRC) Inactive (RRC_INACTIVE) state; initiating a random access (RA) procedure before the SDT procedure is terminated; and determining whether to include a Cell-Radio Network Temporary Identifier (C-RNTI) Medium Access Control (MAC) Control Element (CE) in an uplink (UL) message during the RA procedure based on at least one condition. The at least one condition includes whether the SDT procedure corresponds to a Configured Grant (CG)-SDT procedure. The UL message is a message 3 (Msg3) in a case that the RA procedure is a 4-step RA procedure. The UL message is a message A (MsgA) in a case that the RA procedure is a 2-step RA procedure.

16 Claims, 11 Drawing Sheets

100

(51) Int. Cl.
    *H04W 72/23*       (2023.01)
    *H04W 74/0836*     (2024.01)

(58) Field of Classification Search
    USPC ......................................................... 370/329
    See application file for complete search history.

(56)                  References Cited

U.S. PATENT DOCUMENTS

2024/0188177 A1*   6/2024   Yue ........................ H04W 74/08
2024/0306147 A1*   9/2024   Wang .................... H04W 76/27

OTHER PUBLICATIONS

3GPP TS 38.214, "3rd Generation Partnership Project; Technical Specification Group Radio Access Network; NR; Physical layer procedures for data (Release 16)", Technical Specification, V16.3.0 (Sep. 2020).
3GPP TS 38.321, "3rd Generation Partnership Project; Technical Specification Group Radio Access Network; NR; Medium Access Control (MAC) protocol specification (Release 16)", Technical Specification, V16.2.0 (Sep. 2020).
3GPP TS 38.331, "3rd Generation Partnership Project; Technical Specification Group Radio Access Network; NR; Radio Resource Control (RRC) protocol specification (Release 16)", Technical Specification, V16.2.0 (Sep. 2020).

* cited by examiner

100

200

300

<u>400</u>

500

600A

600B

700A

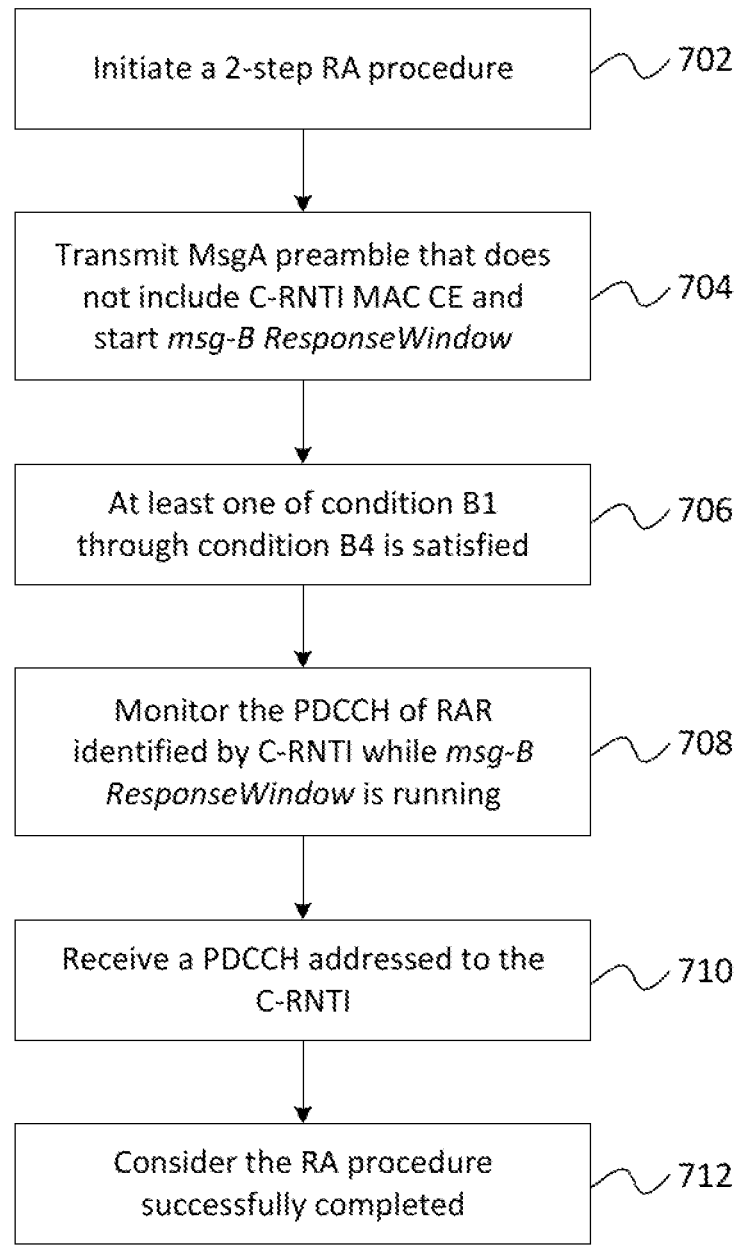

```
┌─────────────────────────────┐
│  Initiate a 2-step RA procedure │──── 702
└─────────────────────────────┘
              │
              ▼
┌─────────────────────────────┐
│  Transmit MsgA preamble that does │
│  not include C-RNTI MAC CE and   │──── 704
│  start msg-B ResponseWindow      │
└─────────────────────────────┘
              │
              ▼
┌─────────────────────────────┐
│  At least one of condition B1    │
│  through condition B4 is satisfied │──── 706
└─────────────────────────────┘
              │
              ▼
┌─────────────────────────────┐
│  Monitor the PDCCH of RAR        │
│  identified by C-RNTI while msg-B │──── 708
│  ResponseWindow is running       │
└─────────────────────────────┘
              │
              ▼
┌─────────────────────────────┐
│  Receive a PDCCH addressed to the │──── 710
│  C-RNTI                          │
└─────────────────────────────┘
              │
              ▼
┌─────────────────────────────┐
│  Consider the RA procedure       │──── 712
│  successfully completed          │
└─────────────────────────────┘
```

USER EQUIPMENT AND METHOD FOR SMALL DATA TRANSMISSION

CROSS-REFERENCE TO RELATED APPLICATION(S)

The present disclosure claims the benefit of and priority to U.S. Provisional Patent Application Ser. No. 63/184,031, filed on May 4, 2021, entitled "METHOD AND APPARATUS TO PERFORM RA PROCEDURE IN RRC_INACTIVE," the content of which is hereby incorporated fully by reference into the present disclosure for all purposes.

FIELD

The present disclosure is related to wireless communication and, more specifically, to a user equipment and a method for small data transmission (SDT) in cellular wireless communication networks.

BACKGROUND

Various efforts have been made to improve different aspects of wireless communication for cellular wireless communication systems, such as $5^{th}$ Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a user equipment (UE) and a method for small data transmission (SDT) in cellular wireless communication networks.

In a first aspect of the present application, a method for SDT performed by a UE is provided. The method includes initiating an SDT procedure while the UE is in a Radio Resource Control (RRC) Inactive (RRC_INACTIVE) state; initiating a random access (RA) procedure before the SDT procedure is terminated; and determining whether to include a Cell-Radio Network Temporary Identifier (C-RNTI) Medium Access Control (MAC) Control Element (CE) in an uplink (UL) message during the RA procedure based on at least one condition. The at least one condition includes whether the SDT procedure corresponds to a Configured Grant (CG)-SDT procedure. The UL message is a message 3 (Msg3) in a case that the RA procedure is a 4-step RA procedure. The UL message is a message A (MsgA) in a case that the RA procedure is a 2-step RA procedure.

In an implementation of the first aspect, the C-RNTI MAC CE is included in the UL message in a case that the SDT procedure corresponds to the CG-SDT procedure.

In another implementation of the first aspect, common control channel (CCCH) data is not allowed to be included in the UL message in a case that the SDT procedure corresponds to the CG-SDT procedure.

In another implementation of the first aspect, the CCCH data corresponds to an RRC Resume Request message.

In another implementation of the first aspect, the C-RNTI MAC CE is not allowed to be included in the UL message in a case that the SDT procedure corresponds to an RA-SDT procedure.

In another implementation of the first aspect, CCCH data is included in the UL message in a case that the SDT procedure corresponds to an RA-SDT procedure.

In another implementation of the first aspect, the at least one condition further includes whether the UE has a valid C-RNTI before initiating the RA procedure; whether the RA procedure is initiated after an initial CG transmission of the CG-SDT procedure; whether the RA procedure is initiated in a subsequent transmission phase of the CG-SDT procedure; and whether the RA procedure is not initiated for transmission of small data.

In another implementation of the first aspect, the C-RNTI MAC CE is included in the UL message in a case that at least one of the at least one condition is satisfied.

In another implementation of the first aspect, CCCH data is not allowed to be included in the UL message in a case that at least one of the at least one condition is satisfied.

In another implementation of the first aspect, the initial CG transmission of the CG-SDT procedure includes transmission of CCCH data.

In a second aspect, a UE for SDT is provided. The UE includes one or more processors and at least one memory coupled to the one or more processors, where the at least one memory stores a computer-executable program that, when executed by the one or more processors, causes the UE to initiate an SDT procedure while the UE is in an RRC_INACTIVE state; initiate an RA procedure before the SDT procedure is terminated; and determining whether to include a C-RNTI MAC CE in an UL message during the RA procedure based on at least one condition. The at least one condition includes whether the SDT procedure corresponds to a CG-SDT procedure. The UL message is a Msg3 in a case that the RA procedure is a 4-step RA procedure. The UL message is a MsgA in a case that the RA procedure is a 2-step RA procedure.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

FIG. 7A is a flowchart illustrating a method for conditionally monitoring a Physical Downlink Control Channel (PDCCH) of a Random Access Response (RAR) identified by a C-RNTI in a 2-step RA procedure, according to an example implementation of the present disclosure.

DESCRIPTION

Figure 1:
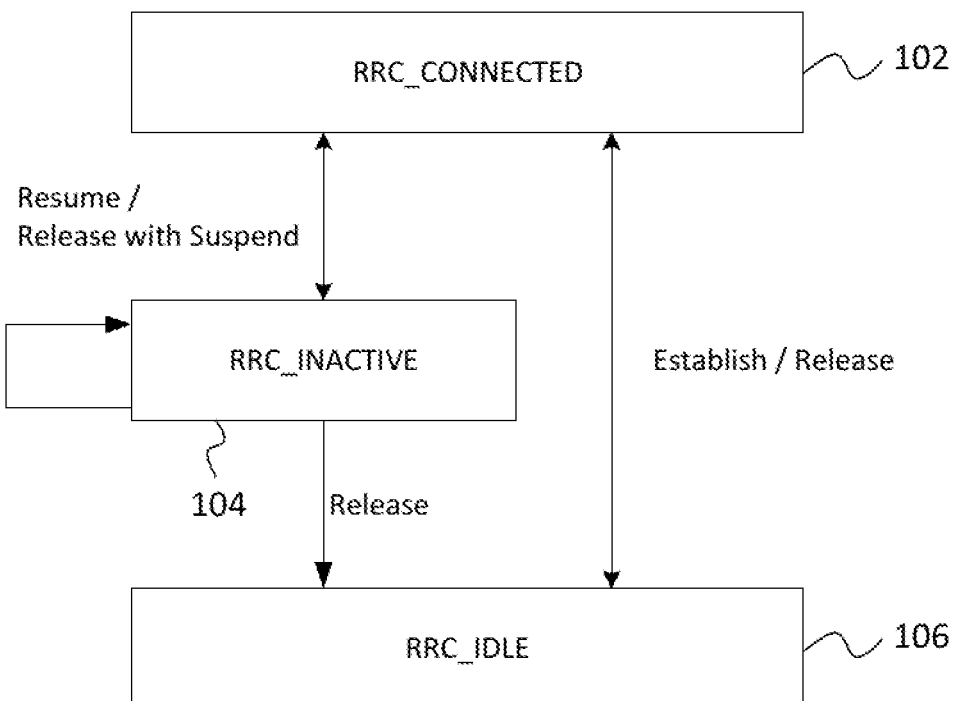
FIG. 1 is a diagram illustrating RRC state transitions in NR, according to an example implementation of the present disclosure.

Abbreviations used in this disclosure include:

| Abbreviation | Full name |
| --- | --- |
| 3GPP | $3^{rd}$ Generation Partnership Project |
| 5G | $5^{th}$ Generation |
| ACK | Acknowledgment |
| AS | Access Stratum |
| BS | Base Station |
| BSR | Buffer Status Report |
| BW | Bandwidth |
| BWP | Bandwidth Part |
| C-RNTI | Cell Radio Network Temporary Identifier |
| CA | Carrier Aggregation |
| CCCH | Common Control Channel |
| CG | Configured Grant/Configured Uplink Grant |
| CN | Core Network |
| CORESET | Control Resource Set |
| CRC | Cyclic Redundancy Check |
| CS-RNTI | Configured Scheduling RNTI |
| CSS | Common Search Space |
| DC | Dual Connectivity |
| DCI | Downlink Control Information |
| DL | Downlink |
| DRB | Data Radio Bearer |
| DRX | Discontinuous Reception |
| DTCH | Dedicated Traffic Channel |
| E-UTRA | Evolved Universal Terrestrial Radio Access |
| FR | Frequency Range |
| HARQ | Hybrid Automatic Repeat Request |
| HARQ-ACK | HARQ Acknowledgement |
| ID | Identifier |
| IE | Information Element |
| I-RNTI | Inactive RNTI |
| LCH | Logical Channel |
| LCG | Logical Channel Group |
| LTE | Long Term Evolution |
| MAC | Medium Access Control |
| MAC CE | MAC Control Element |
| MCG | Master Cell Group |
| MN | Master Node |
| Msg1 | Message 1 |
| Msg2 | Message 2 |
| Msg3 | Message 3 |
| Msg4 | Message 4 |
| MsgA | Message A |
| MsgB | Message B |
| NACK | Negative Acknowledgment |
| NDI | New Data Indicator |
| NR | New Radio |
| NUL | Normal Uplink Carrier |
| NW | Network |
| OFDM | Orthogonal Frequency Division Multiplexing |
| P-RNTI | Paging RNTI |
| PCell | Primary Cell |
| PDCCH | Physical Downlink Control Channel |
| PDCP | Packet Data Convergence Protocol |
| PDSCH | Physical Downlink Shared Channel |

-continued

| Abbreviation | Full name |
| --- | --- |
| PDU | Protocol Data Unit |
| PHY | Physical (Layer) |
| PRACH | Physical Random Access Channel |
| PSCell | Primary SCG Cell/Primary Secondary Cell |
| PUCCH | Physical Uplink Control Channel |
| PUSCH | Physical Uplink Shared Channel |
| RA | Random Access |
| RAN | Radio Access Network |
| RAR | Random Access Response |
| RAT | Radio Access Technology |
| RB | Radio Bearer |
| Rel | Release |
| RF | Radio Frequency |
| RLC | Radio Link Control |
| RLF | Radio Link Failure |
| RNA | RAN Notification Area |
| RNAU | RNA Update |
| RNTI | Radio Network Temporary Identifier |
| RRC | Radio Resource Control |
| RS | Reference Signal |
| RSRP | Reference Signal Received Power |
| SCell | Secondary Cell |
| SCG | Secondary Cell Group |
| SDAP | Service Data Adaptation Protocol |
| SDT | Small Data Transmission |
| SFN | System Frame Number |
| SI | System Information |
| SIB | System Information Block |
| SLIV | Start and Length Indicator Value |
| SN | Secondary Node |
| SpCell | Special Cell |
| SR | Scheduling Request |
| SRB | Signaling Radio Bearer |
| SS | Search Space |
| SSB | Synchronization Signal Block |
| SUL | Supplementary Uplink Carrier |
| TA | Timing Advance |
| TB | Transport Block |
| TBS | Transport Block Size |
| TMSI | Temporary Mobile Subscriber Identity |
| TRP | Transmission Reception Point |
| TS | Technical Specification |
| UE | User Equipment |
| UL | Uplink |
| URLLC | Ultra-Reliable and Low-Latency Communication |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A. B and C."

The terms "system" and "network" may be used interchangeably. The term "and/or" is only an association relationship for describing associated objects and represents that three relationships may exist such that A and/or B may indicate that A exists alone. A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability.

The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC. NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code.

The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following sentences, paragraphs, (sub)-bullets, points, actions, behaviors, terms, alternatives, aspects, examples, or claims described in the following description(s) may be combined logically, reasonably, and properly to form a specific method.

Any sentence, paragraph, (sub)-bullet, point, action, behaviors, terms, alternatives, aspects, examples, or claims described in the following description(s) may be implemented independently and separately to form a specific method.

Dependency. e.g., "based on", "more specifically", "in some implementations", "in one embodiment", "in one alternative". "in one example", "in one aspect". "in one implementation", "in some implementations", or etc., in the following description(s) is just one possible example which would not restrict the specific method.

One aspect of the present solution/disclosure may be used, for example, in a communication, communication equipment (e.g., a mobile telephone apparatus, a base station apparatus, a wireless Local Area Network (LAN) apparatus, and/or a sensor device, etc.), and integrated circuit (e.g., a communication chip) and/or a program, etc.

According to any two or more than two of the following sentences, paragraphs, (sub)-bullets, points, actions, behaviors, terms, alternatives, aspects, examples, embodiments, or claims described in the following invention(s), "X/Y" includes the meaning of "X or Y".

According to any two or more than two of the following sentences, paragraphs. (sub)-bullets, points, actions, behaviors, terms, alternatives, aspects, examples, embodiments, or claims described in the following invention(s), "X/Y" includes the meaning of "X and Y".

According to any two or more than two of the following sentences, paragraphs, (sub)-bullets, points, actions, behaviors, terms, alternatives, aspects, examples, embodiments, or claims described in the following invention(s). "X/Y" includes the meaning of "X and/or Y".

Examples of some selected terms are provided as follows.

SDT: SDT may be a UL data transmission in an RRC_I-NACTIVE state. The packet size (or data volume) of the UL data may be lower than a threshold. The UL data of SDT may be transmitted during an SDT procedure. The UL data of SDT may be transmitted via Msg 3 (e.g., based on a 4-step RA), via MsgA (e.g., based on a 2-step RA), and/or via a CG resource (e.g., CG type 1). The UL data of SDT may be transmitted based on a dynamic scheduling and/or a semi-persistent scheduling when the UE is in the RRC_INAC-TIVE state.

UE: The UE in the present disclosure may refer to a PHY/MAC/RLC/PDCP/SDAP entity. The PHY/MAC/RLC/PDCP/SDAP entity in the present disclosure may refer to the UE.

Network (NW): The NW may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated cell or a deactivated serving cell.

Special Cell (SpCell): For Dual Connectivity operation, the term Special Cell refers to the PCell of the MCG or the PSCell of the SCG depending on whether the MAC entity is associated with the MCG or the SCG, respectively. Otherwise, the term Special Cell refers to the PCell. A Special Cell supports PUCCH transmission and contention-based Random Access, and is always activated.

CG PUSCH: A CG PUSCH may be referred to as a PUSCH that corresponds to a CG configuration in the present disclosure.

RRC State

According to 3GPP TS 38.300 V16.2.0, a UE may be either in the RRC_CONNECTED state or in the RRC_I-NACTIVE state when an RRC connection has been established. If no RRC connection is established, the UE may be in RRC_IDLE state. Moreover, what can be performed by the UE in each RRC state is as follows:

A UE in the RRC_IDLE state may perform the following actions: a UE-specific DRX may be configured; UE-controlled mobility may be configured based on network configuration; monitor Short Messages transmitted with P-RNTI over DCI; monitor a Paging channel for CN paging using 5G-S-TMSI; perform neighboring cell measurements and cell (re-)selection; acquire system information; and send SI requests (if configured).

A UE in the RRC_INACTIVE state may perform the following actions: a UE-specific DRX may be configured; UE controlled mobility may be configured based on network configuration; store the UE Inactive AS context; a RAN-based notification area may be configured by RRC layer; monitor Short Messages transmitted with P-RNTI over DCI; monitor a Paging channel for CN paging using 5G-S-TMSI and RAN paging using full 1-RNTI; perform neighboring cell measurements and cell (re-)selection; perform RAN-based notification area updates periodically and when moving outside the configured RAN-based notification area; acquire system information; and send SI request (if configured).

A UE in RRC_CONNECTED may perform the following actions: store the AS context; transfer unicast data to/from another UE; a UE-specific DRX may be, configured; for UEs supporting CA, use of one or more SCells, aggregated with the SpCell, for increased BW; for UEs supporting DC, use of one SCG, aggregated with the MCG, for increased BW; network-controlled mobility within NR and to/from E-UTRA may be supported, including handover between NR cells and perform handover from NR/E-UTRA cell to an E-UTRA/NR cell; monitor Short Messages transmitted with P-RNTI over DCI, if configured; monitor control channels associated with the shared data channel to determine if data is scheduled for it; provide channel quality and feedback information; perform neighboring cell measurements and measurement reporting; and acquire system information.

RRC State Transition

FIG. 1 is a diagram 100 illustrating RRC state transitions in NR, according to an example implementation of the present disclosure. RRC state transitions in NR may be referred to 3GPP TS 38.300 V16.2.0. A UE may have only one RRC state in NR at one time.

The network may initiate an RRC connection release procedure by sending an RRCRelease message (with sus-pendConfig) to a UE. This procedure may be initiated for the following purposes: transit the UE in RRC_CONNECTED 102 to RRC_IDLE 106; transit the UE in RRC_CON-NECTED 102 to RRC_INACTIVE 104 (only if SRB2 and at least one DRB are set up in RRC_CONNECTED 102); keep the UE in RRC_INACTIVE 104 when the UE tries to resume; transit the UE in RRC_INACTIVE 104 to RRC_IDLE 106 when the UE tries to resume.

The network may send an RRCRelease message without suspendConfig to transit the UE from RRC_CONNECTED 102 or RRC_INACTIVE 104 to RRC_IDLE 106. In contrast, the network may send an RRCRelease message with suspendConfig to transit the UE from RRC_CONNECTED 102 or RRC_INACTIVE 104 to RRC_INACTIVE 104.

Upon reception of an RRCRelease message with suspend-Config from the network, the UE may perform (but is not limited to) one and/or more of the following actions (according to 3GPP TS 38.331 V16.2.0): apply the received suspendConfig; reset MAC and release the default MAC Cell Group configuration, if any; re-establish RLC entities for SRB1; suspend all SRB(s) and DRB(s), except SRB0; indicate PDCP suspend to lower layers of all DRBs; indicate the suspension of the RRC connection to upper layers; enter RRC_INACTIVE 104 and perform cell (re)selection as specified in 3GPP TS 38.331 V16.2.0.

The suspendConfig IE may include (but is not limited to) the following IEs:

fullI-RNTI/short1-RNTI: used to identify the suspended UE context of a UE in RRC_INACTIVE 104;

ran-PagingCycle: the UE-specific cycle for RAN-initiated paging. Value rf32 corresponds to 32 radio frames, value rf64 corresponds to 64 radio frames, and so on.

ran-NotficationAreaInfo: network ensures that the UE in RRC_INACTIVE 104 always has a valid ran-NotficationAreaInfo.

t380: the timer that triggers the periodic RNAU procedure in UE. Value min5 corresponds to 5 minutes, value min10 corresponds to 10 minutes, and so on.

Configured Uplink Grant (CG)

In NR Rel-15 and Rel-16, the network may allocate uplink resources for the initial transmissions to UEs in the RRC_CONNECTED state via a configured uplink grant (e.g., as specified in 3GPPTS 38.321 V16.2.0). In general, there are two types of configured uplink grants:

CG Type 1, where an uplink grant is provided by RRC, and stored as a configured uplink grant;

CG Type 2, where an uplink grant is provided by PDCCH, and stored or cleared as a configured uplink grant based on L1 signalling indicating configured uplink grant activation or deactivation.

CG Type 1 and CG Type 2 may be configured by RRC per serving cell and per BWP. Multiple configurations may be active simultaneously on the same serving cells/BWPs. For CG Type 2, activation and deactivation are independent among the serving cells. For the same serving cell/BWP, the MAC entity may be configured with both CG Type 1 and CG Type 2.

RRC may configure the following parameters when CG Type 1 is configured:

cs-RNTI: CS-RNTI for retransmission;

periodicity: periodicity of configured grant Type 1;

timeDomainOffset: offset of a resource with respect to SFN=0 in the time domain;

timeDomainAllocation: allocation of configured uplink grant in the time domain which contains startSymboAndLength (e.g., SLIV in 3GPP TS 38.214 V16.3.0);

nrofHARQ-Processes: the number of HARQ processes for a configured grant.

RRC may configure the following parameters when the CG Type 2 is configured:

cs-RNTI: CS-RNTI for retransmission;

periodicity: periodicity of configured grant Type 2;

nrofHARQ-Processes: the number of HARQ processes for configured grant.

Upon configuration of a configured grant Type 1 for a serving cell by upper layers, the MAC entity may:

store the uplink grant provided by upper layers as a configured uplink grant for the indicated serving cell;

initialize or re-initialize the configured uplink grant to start in the symbol according to timeDomainOffset and S (derived from SLIV as specified in 3GPP TS 38.214 V16.3.0), and to reoccur with periodicity.

CG-Based SDT Procedure

Figure 2:
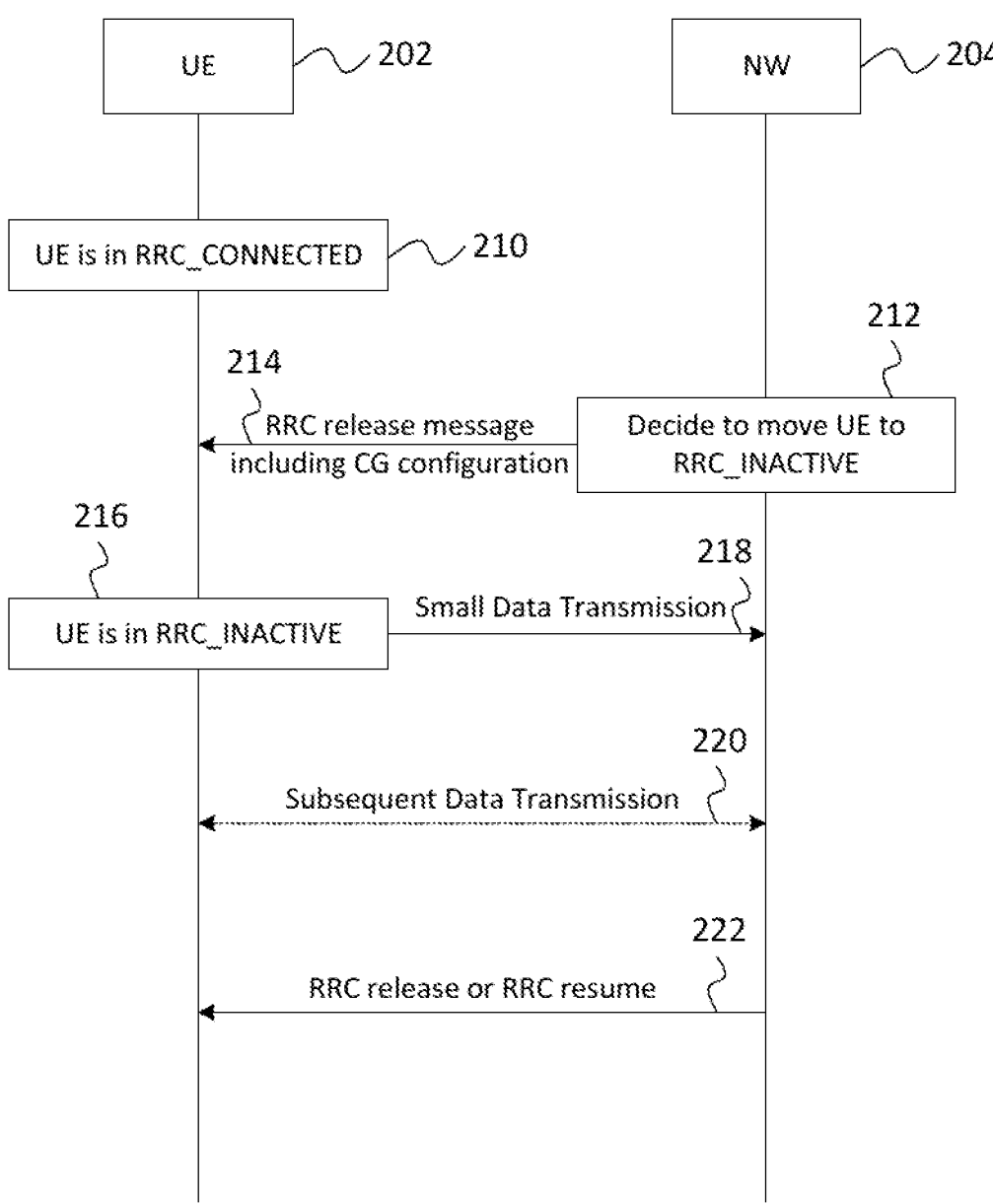
FIG. 2 is a diagram illustrating a CG-based SDT procedure in NR, according to an example implementation of the present disclosure.

FIG. 2 is a diagram illustrating a CG-based SDT procedure 200 in NR, according to an example implementation of the present disclosure. It should be noted that "CG-based SDT procedure" may also be referred to as "CG-SDT procedure" in the present disclosure.

In action 210, UE 202 is in the RRC_CONNECTED state. In some implementations, UE 202 may be in the RRC_I-NACTIVE state. In some implementations. UE 202 may send a CG configuration request to NW 204 to indicate its preference on configuration with CG type 1 for the RRC_I-NACTIVE state.

In action 212, NW 204 may decide to move UE 202 to the RRC_INACTIVE state. In action 214, NW may send an RRC release message (including suspendconfig) to UE 202. The RRC release message may include a CG configuration to configure CG resources to UE 202. Alternatively, the CG configuration may be provided in the RRC reconfiguration while the UE is in the RRC_CONNECTED state. The CG configuration (e.g., ConfiguredGrantConfig) may include but is not limited to the following information: CG periodicity, TBS, the number for the implicit release of the CG resources. CG Timer (e.g., configuredGrantTimer), retransmission timer (e.g., cg-RetransmissionTimer), the number of HARQ processes reserved for CG in SDT. RSRP threshold for SSB selection and association between SSB and CG resources, and TA-related parameters (e.g., TA timer).

In action 216. UE 202 is in the RRC_INACTIVE state. In action 218, UE 202 may perform SDT via CG resources (in the RRC_INACTIVE state) according to the CG configuration (e.g., configured in action 214). Moreover, an RRC Resume Request message (e.g., RRCResumeRequest) may be sent.

After the first UL transmission on a CG resource in the CG-SDT procedure (e.g., action 218), in action 220, UE 202 may perform a subsequent data transmission. It should be noted that "subsequent data transmission" may also be referred to as "subsequent data transmission phase", "subsequent transmission", or "subsequent transmission phase" in the present disclosure. The subsequent data transmission may include transmission of multiple UL and/or DL packets as part of the same CG-SDT procedure without UE transitioning to the RRC_CONNECTED state (e.g., UE 202 is still in the RRC_INACTIVE state). In some implementations. UE 202 may monitor a PDCCH via a specific RNTI (e.g., C-RNTI) to receive dynamic scheduling for UL and/or DL new transmission and/or the corresponding retransmission. UE 202 may monitor a PDCCH via a UE-specific RNTI (e.g., C-RNTI) to receive the dynamic scheduling for the retransmission of CG type 1. UE 202 may perform the subsequent data transmission via a CG resource according to the CG configuration (e.g., configured in action 214).

In action 222, NW 204 may send an RRC release message to keep UE 202 in the RRC_INACTIVE state or move UE 202 to the RRC_IDLE state. Alternatively. NW 204 may send an RRC resume message to move UE 202 to the RRC_CONNECTED state.

It should be noted that the order of the actions in FIG. 2 may be changed according to implementations. In the present disclosure, a CG-based SDT procedure may also be referred to as a combination of action 218, action 220, and action 222. In the present disclosure, the subsequent data transmission phase (e.g., action 220) of the CG-based SDT procedure may occur after action 218 and before action 222.

RA-Based SDT Procedure

Figure 3:
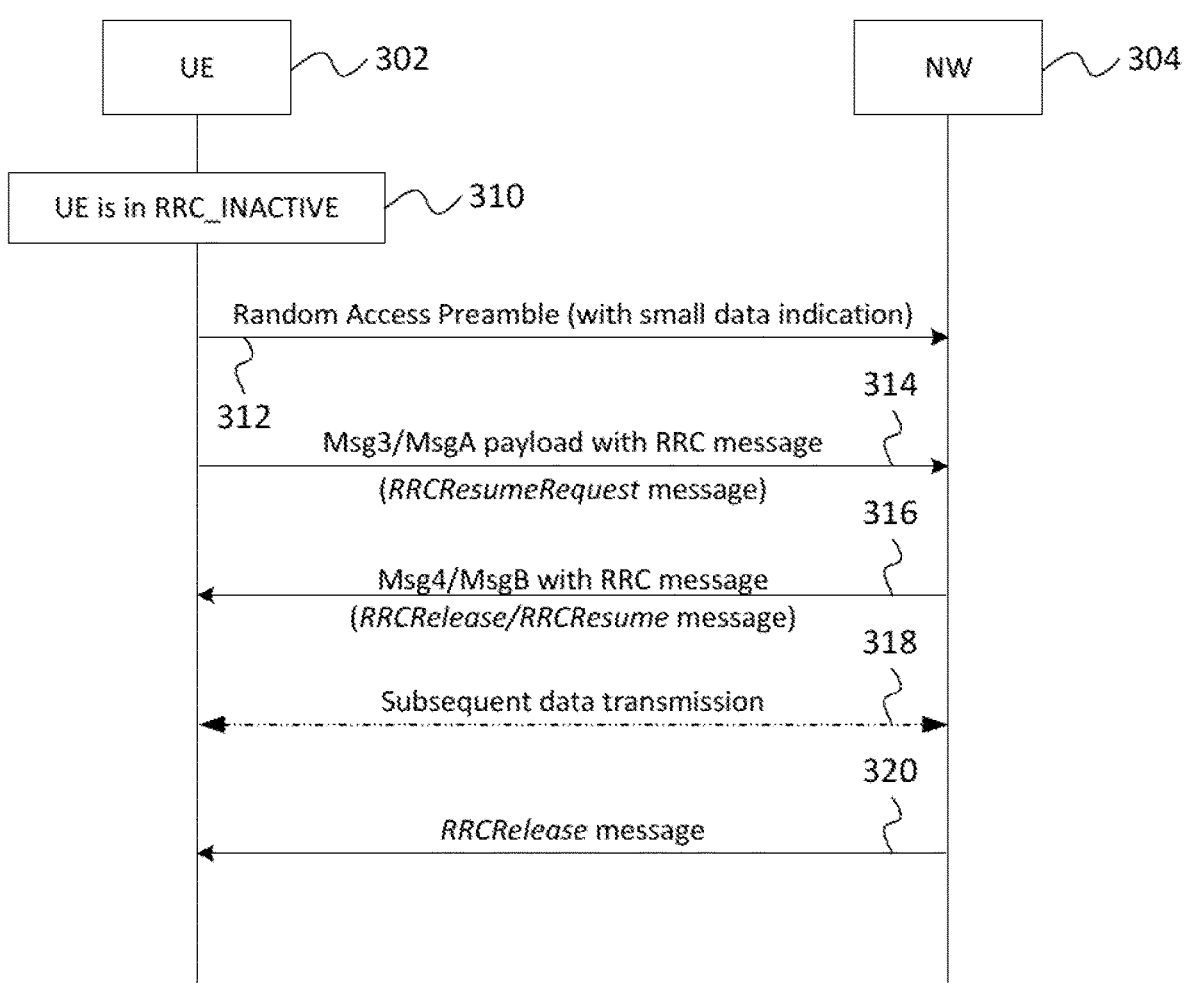
FIG. 3 is a diagram illustrating an RA-based SDT procedure in NR, according to an example implementation of the present disclosure.

FIG. 3 is a diagram illustrating an RA-based SDT procedure 300 in NR, according to an example implementation of the present disclosure. It should be noted that "RA-based SDT procedure" may also be referred to as "RA-SDT procedure" in the present disclosure.

In action 310, UE 302 is in the RRC_INACTIVE state. When UE 302 has UL data available for transmission, UE 302 may initiate an RA-based SDT procedure for transmission of the UL data. As part of the RA-based SDT procedure, UE 302 may initiate an RA procedure, which includes selection of either a 4-step RA type or a 2-step RA type for the RA procedure. In action 312, UE 302 may transmit an RA preamble with small data indication to NW 304. The PRACH resource for the RA procedure (e.g., RA preamble with small data indication) may be different from that for a normal RA procedure (e.g., RA preamble without small data indication). UE 302 may select the PRACH resource (for the purpose of SDT) for the RA procedure as part of the RA-based SDT procedure.

After transmitting the RA preamble, in action 314. UE 302 may transmit an RRC message through Msg3 (when the 4-step RA type is selected) or MsgA (when the 2-step RA type is selected). The RRC message may be an RRC Resume Request message (e.g., RRCResumeRequest). In some implementations, MAC CE (e.g., BSR) and DRB/SRB data packet (e.g., small data) may be included in Msg3/MsgA in addition to the RRC message.

After transmitting the Msg3/MsgA. UE 302 may monitor RA-RNTI/MsgB-RNTI for Msg4/MsgB in which the contention resolution ID will be carried. In action 316, NW 304 may transmit an RRC message in Msg4/MsgB. The RRC message may be an RRC Release message (with suspend-Config IE) or an RRC Resume message. UE 302 may stay in the RRC_INACTIVE state upon receiving the RRC Release message (with suspendConfig IE). UE 302 may enter the RRC_CONNECTED state upon receiving the RRC Resume message. In addition, a MAC CE (e.g., BSR) and a DRB data packet (e.g., small data) may be included in the Msg4/MsgB as well.

Once the RA procedure as part of the RA-based SDT procedure is successfully completed, in action 318, UE 302 may monitor a specific RNTI (e.g., C-RNTI) for a subsequent data transmission. It should be noted that "subsequent data transmission" may also be referred to as "subsequent data transmission phase", "subsequent transmission", or "subsequent transmission phase" in the present disclosure. A subsequent data transmission may include transmission of multiple UL and/or DL packets as part of the same RA-SDT procedure without the UE transitioning to the RRC_CONNECTED state (e.g., UE 302 is still in the RRC_INACTIVE state). In some implementations, UE 302 may monitor a PDCCH via a specific RNTI (e.g., C-RNTI) to receive the dynamic scheduling for UL and/or DL new transmission and/or the corresponding retransmission. UE 302 may monitor PDCCH via a UE-specific RNTI (e.g., C-RNTI) to receive the dynamic scheduling for the retransmission of CG type 1.

In action 320, UE 302 may receive an RRC Release message from NW 304. Once the RRC Release message (with suspendConfig E) is received, UE 302 may stop monitoring the C-RNTI and enter a normal RRC_INACTIVE state. It should be noted that the RRC Release message may either be received in Msg4/MsgB and/or a PDSCH indicated by a dynamic scheduling.

It should be noted that the order of the actions in FIG. 3 may be changed according to implementation. For example, action 314 may occur before action 312, and so on. Combination of action 312, action 314, and action 316 may also be referred to as an RA procedure that is initiated as part of the RA-based SDT procedure. In the present disclosure, the subsequent data transmission phase (e.g., action 318) of the RA-based SDT procedure may occur after action 316 and before action 320.

As illustrated in FIG. 3, the RA procedure that is initiated during the RA-SDT procedure may be triggered due to a need for transmission of the RRC Resume Request message (or CCCH data). When an RA procedure is initiated by the UE for transmitting the RRC Resume Request message (or due to data arrival at a CCCH), the UE may not include a C-RNTI MAC CE in a UL message of the RA procedure, where the UL message may be Msg3 of a 4-step RA procedure or MsgA of a 2-step RA procedure. The RRC Resume Request message (or the CCCH data) may be included in the UL message.

Mechanism to Perform RA Procedure in RRC_INACTIVE

Based on the UE behavior defined in 3GPP TS 38.321 V16.2.0 for NR Rel-15 and NR Rel-16 UEs, if a 2-step RA procedure is initiated, (the MAC entity of) the UE may determine whether the 2-step RA procedure is initiated for the CCCH logical channel (e.g., RA is initiated due to data in the CCCH that is available for transmission). Moreover. (the MAC entity of) the UE may include a C-RNTI MAC CE in the MsgA payload only if the RA procedure is not initiated for the CCCH logical channel. The MAC entity of the UE may indicate to the multiplexing and assembly entity to include a C-RNTI MAC CE in the MsgA payload only if the RA procedure is not initiated for the CCCH logical channel. Similarly, according to 3GPP TS 38.321 V16.2.0, if a 4-step RA procedure is performed, a UE may also determine whether the 4-step RA procedure is initiated for the CCCH logical channel (e.g., RA is initiated due to data in the CCCH that is available for transmission). Moreover, (the MAC entity of the UE may include a C-RNTI MAC CE in the UL resource only if the RA procedure is not initiated for the CCCH logical channel. The MAC entity of the UE may indicate to the multiplexing and assembly entity to include a C-RNTI MAC CE in the MsgA payload only if the RA procedure is not initiated for the CCCH logical channel.

Figure 4:
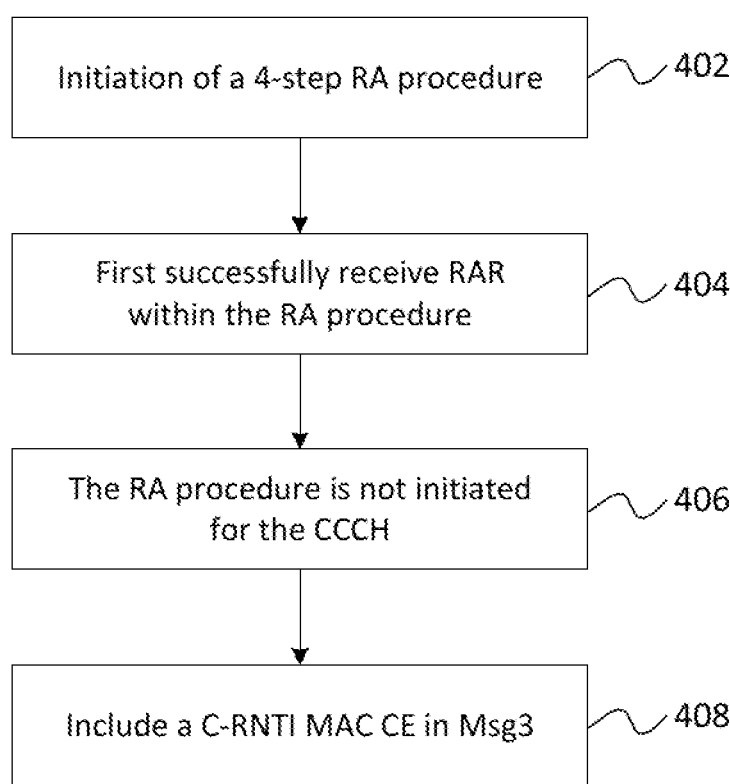
FIG. 4 is a flowchart illustrating a method for generating a MAC Protocol Data Unit (PDU) for a Msg3 transmission, according to an example implementation of the present disclosure.

FIG. 4 is a flowchart 400 illustrating a method for generating a MAC PDU for a Msg3 transmission, according to an example implementation of the present disclosure. In action 402, a 4-step RA procedure is initiated. In action 404, the UE first successfully receives a RAR within the RA procedure. The UE may determine whether to include a C-RNTI MAC CE in Msg3 based on whether the RA procedure is initiated for the CCCH. In action 406, the UE determines that the RA procedure is not initiated for the CCCH. In action 408, the UE determines to include a C-RNTI MAC CE in Msg3.

Figure 5:
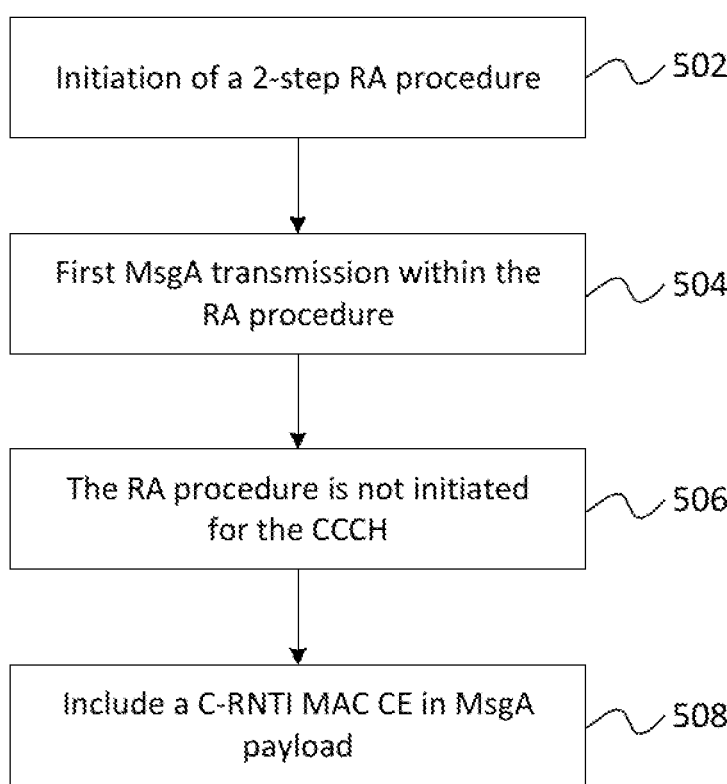
FIG. 5 is a flowchart illustrating a method for generating a MAC PDU for a MsgA payload transmission, according to an example implementation of the present disclosure.

FIG. 5 is a flowchart 500 illustrating a method for generating a MAC PDU for a MsgA payload transmission, according to an example implementation of the present disclosure. In action 502, a 2-step RA procedure is initiated. In action 504, the UE performs a first MsgA transmission within the RA procedure. The UE may determine whether to include a C-RNTI MAC CE in MsgA based on whether the RA procedure is initiated for the CCCH. In action 506, the UE determines that the RA procedure is not initiated for the CCCH. In action 508, the UE determines to include a C-RNTI MAC CE in MsgA payload.

One assumption in NR Rel-17 and beyond is that a UE in the RRC_INACTIVE state may initiate an RRC Connection Resume Procedure or another RRC procedure specifically for SDT whenever UL data from a configured/unsuspended RLC bearer/SRB/DRB/DTCH/LCH (e.g., for small data transmission) becomes available for transmission. Moreover, upon initiation of an RRC Connection Resume Procedure or another RRC procedure specifically for SDT, the UE may initiate transmission of an RRCResumeRequest/RRCResumeRequest1 message or an RRC message for the purpose of SDT. For example, the RRC layer of the UE may initiate transmission of the RRCResumeRequest/RRCResumeRequest1 or the RRC message for the purpose of SDT. Moreover. RRCResumeRequest/RRCResumeRequest1 and/or the RRC message for the purpose of SDT may be submitted, internally, from the RRC layer of the UE to the MAC layer of the UE through SRB0/CCCH. Subsequently, the MAC layer of the UE may consider UL data from a CCCH being available for transmission. The UL data that is available for transmission may be referred to as the RRCResumeRequest/RRCResumeRequest1 and/or the RRC message for the purpose of SDT. If the UE does not have a configured/scheduled UL resource (e.g., PUSCH resource) for transmission of the UL data from a CCCH and/or DTCH (e.g., small data), the UE may initiate an RA procedure for transmission of the UL data from a CCCH and/or DTCH (e.g., small data), e.g., the RA procedure is initiated for the CCCH logical channel. The UE may choose either a 2-step RA type or a 4-step RA type to perform the RA procedure for transmission of the UL data from a CCCH and/or DTCH (e.g., small data).

Another assumption in NR Rel-17 and beyond is that a UE in the RRC_INACTIVE state may have a valid C-RNTI. For example, after a CG-SDT procedure is initiated by the UE, a valid C-RNTI may be used for monitoring on a PDCCH during the CG-SDT procedure for the scheduling of UL/DL resource for subsequent data transmission after the UE transmits a first UL transmission on a CG PUSCH in the CG-SDT procedure. After an RA-SDT procedure is initiated by the UE, a valid C-RNTI may be used for monitoring on a PDCCH during the RA-SDT procedure for the scheduling of a UL/DL resource for a subsequent data transmission after an RA procedure as part of the RA-SDT procedure is completed. In some implementations, the C-RNTI may be used to monitor a scheduling on a PDCCH for UL resources (e.g., PUSCH resources) for new transmission and/or retransmission while the UE is in the RRC_INACTIVE state. In some implementations, the C-RNTI may also be used to receive a response (e.g., ACK, NACK, fallback indication, etc.) from the network in response to SDT via a UL resource (e.g., CG resource). For example, the UE may (re)start a timer/window after SDT via a UL resource (e.g., CG resource). While the timer/window is running, the UE may monitor on a specific search space/CORESET/PDCCH for possible transmission(s) of responses and/or scheduling of UL/DL resources from the network. The timer/window may again be (re)started when the UE receives a response and/or scheduling of a UL/DL resource from the network. However, if the UE does not receive a response and/or scheduling of a UL resource from the network, the UE may consider transmission on the UL resource to be unsuccessful when the timer/window expires. The UL resource (e.g., CG resource) may be discarded/released/suspended/cleared when the timer/window expires.

Based on the above-mentioned assumptions, the UE behavior defined in 3GPPTS 38.321 V16.2.0 for NR Rel-15 and NR Rel-16 UEs may not be optimal in NR Rel-17 and beyond, especially to a UE that needs to perform SDT in the RRC_INACTIVE state. In particular, if small data arrives at an RB(s)/LCH(s) configured for SDT, and the conditions to perform an RA-SDT procedure is satisfied, the UE may initiate an RA-SDT procedure and transmit an RRC message (e.g., RRCResumeRequest/RRCResumeRequest/message or another RRC message for the purpose of SDT) as part of the RA-SDT procedure. The RRCResumeRequest/RRCResumeRequest1 message may be conveyed via SRB0/CCCH of the UE. However, based on the UE behavior defined in 3GPP TS 38.321 V16.2.0, when a 4-step RA procedure is initiated by a UE, the UE may not include a C-RNTI MAC CE in Msg3 transmission of the 4-step RA procedure (e.g., the Msg3 may be transmitted via a UL resource indicated by a RAR) if the 4-step RA procedure is initiated due to data arrival at a CCCH (e.g., the 4-step RA procedure is initiated for a CCCH logical channel). Here, the UE may include data from the CCCH in the Msg3 transmission of the 4-step RA procedure. When a 2-step RA procedure is initiated by a UE, the UE may not include a C-RNTI MAC CE in a UL resource for MsgA payload transmission during the 2-step RA procedure if the 2-step RA procedure is initiated due to data arrival at a CCCH (e.g., the 2-step RA procedure is initiated for a CCCH logical channel).

In some implementations, when a 4-step RA procedure is initiated by a UE, the UE may not include a C-RNTI MAC CE in Msg3 transmission of the 4-step RA procedure (e.g., the Msg3 may be transmitted via an UL resource indicated by RAR) if the 4-step RA procedure is initiated as part of an RA-based SDT procedure. The reason is that the 4-step RA procedure is initiated due to data arrival at a CCCH (e.g., RRC Resume Request message). Instead, the UE may include data from the CCCH in Msg 3 transmission during the 4-step RA procedure that is initiated as part of the RA-based SDT procedure. In some implementations, when a 2-step RA procedure is initiated by a UE, the UE may not include a C-RNTI MAC CE in MsgA payload transmission of the 2-step RA procedure if the 2-step RA procedure is initiated as part of an RA-based SDT procedure. The reason is that the 2-step RA procedure is initiated due to data arrival at a CCCH (e.g., RRC Resume Request message). Instead, the UE may include data from the CCCH in the UL resource for the MsgA payload transmission during the 2-step RA procedure that is initiated as part of the RA-based SDT procedure. The data from the CCCH, which is included in the Msg3/MsgA payload transmission of the 4-step/2-step RA procedure, may correspond to an RRCResumeRequest/RRCResumeRequest1 message. In some implementations, the UE may include a C-RNTI MAC CE in the Msg3 or the MsgA payload only if the 2-step/4-step RA procedure is not initiated due to data arrival at a CCCH.

Based on 3GPP TS 38.321 V16.2.0, after an RA procedure is initiated by a UE as part of an RA-SDT procedure (e.g., due to arrival of small data at the RLC bearer(s)/RB(s)/LCH(s) configured for SDT), the UE may not include a C-RNTI MAC CE in a Msg3/MsgA payload of the RA procedure (as part of the RA-SDT procedure). As a result, to complete the RA procedure, the network may have to transmit a downlink assignment associated with the UE's Temporary_C-RNTI/MsgB-RNTI in order to schedule a PDSCH for the transmission of Msg4 (e.g., contention resolution identity MAC CE)/MsgB. This may cause more resource wastage due to the payload of the Msg4 (e.g., contention resolution identity MAC CE)/MsgB MAC PDU. Moreover, the network may not complete the RA procedure via a UL grant by Msg4/MsgB. As a result, the pending small data at the UE may not be transmitted in a UL resource provided by Msg4/MsgB. The pending small data may only be transmitted after the RA procedure is completed, e.g., via a UL resource scheduled by a UL grant during a subsequent data transmission phase of the RA-SDT procedure.

Conditionally Include a C-RNTI MAC CE in Msg3/MsgA Payload of an RA Procedure

In some implementations, a UE may conditionally include a C-RNTI MAC CE in a Msg3/MsgA payload of a RA procedure even if the RA procedure is initiated due to data arrival at a CCCH configured for the UE. The UE may determine whether to include a C-RNTI MAC CE in Msg3/MsgA in an RA procedure initiated during an SDT procedure.

In some implementations, after a UE initiates a 4-step RA procedure, the UE may receive a (first) RAR as part of the 4-step RA procedure. The UE may include a C-RNTI MAC CE with CCCH data in the UL resource indicated by the RAR if at least one of the following conditions (e.g., from condition A1 through condition A4) is satisfied.

In some implementations, after a UE initiates a 2-step RA procedure, the UE may perform a (first) MsgA transmission as part of the 2-step RA procedure, and the MsgA transmission may include transmission of a MsgA payload. The UE may include a C-RNTI MAC CE with CCCH data in the MsgA payload if at least one of the following conditions (e.g., from condition A1 through condition A4, described in greater detail below) is satisfied.

Figure 6A:
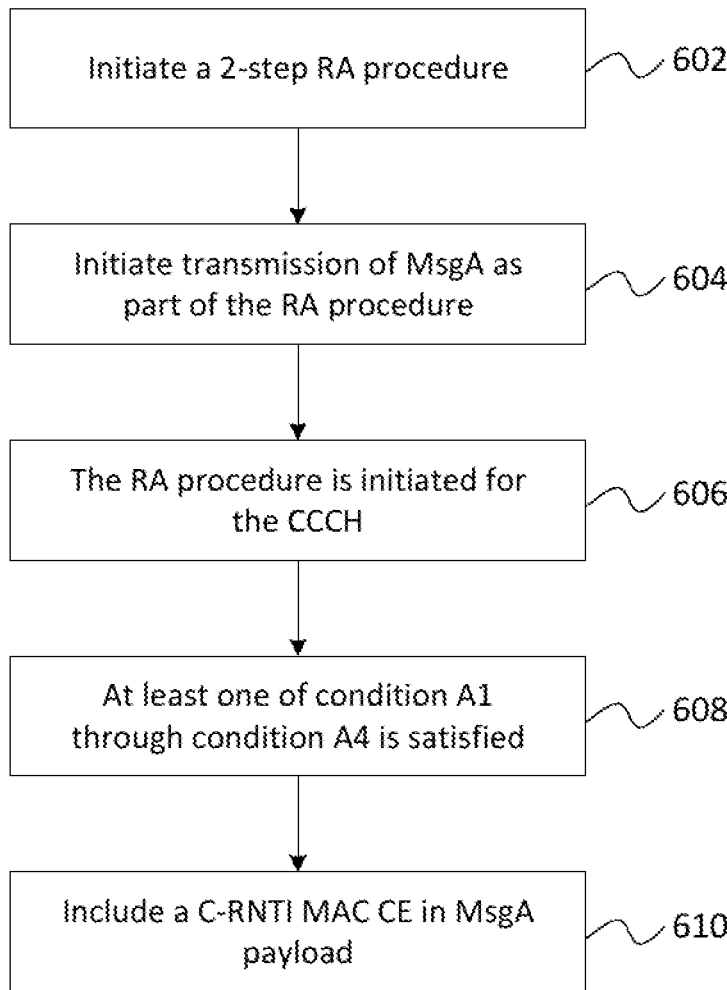
FIG. 6A is a flowchart illustrating a method for conditionally multiplexing a C-RNTI MAC CE with CCCH data in a MAC PDU for a MsgA payload transmission, according to an example implementation of the present disclosure.

FIG. 6A is a flowchart 600A illustrating a method for conditionally multiplexing a C-RNTI MAC CE with CCCH data in a MAC PDU for a MsgA payload transmission, according to an example implementation of the present disclosure. In action 602, the UE initiates a 2-step RA procedure. In action 604, the UE initiates transmission of MsgA as part of the RA procedure. In action 606, the UE determines that the RA procedure is initiated for the CCCH. In action 608, the UE determines that at least one of condition A1 through condition A4 (described in greater detail below) is satisfied. In action 610, the UE determines to include a C-RNTI MAC CE in the MsgA payload.

Figure 6B:
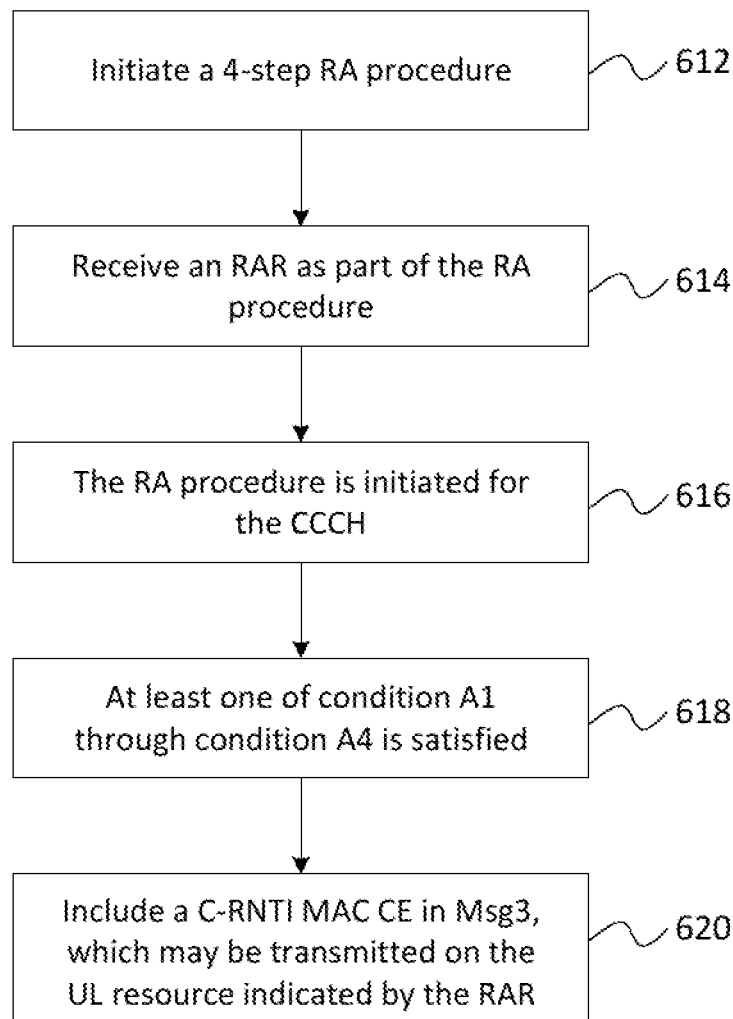
FIG. 6B is a flowchart illustrating a method for conditionally multiplexing a C-RNTI MAC CE with CCCH data in a MAC PDU for a Msg3 transmission, according to an example implementation of the present disclosure.

FIG. 6B is a flowchart 600B illustrating a method for conditionally multiplexing a C-RNTI MAC CE with CCCH data in a MAC PDU for Msg3 transmission, according to an example implementation of the present disclosure. In action 612, the UE initiates a 4-step RA procedure. In action 614, the UE receives a RAR as part of the RA procedure. In action 616, the UE determines that the RA procedure is initiated for the CCCH. In action 618, the UE determines that at least one of condition A1 through condition A4 (described in greater detail below) is satisfied. In action 620, the UE determines to include a C-RNTI MAC CE in Msg3, which may be transmitted on a UL resource indicated by the RAR.

In some implementations, if a UE determines to transmit a MAC PDU including a C-RNTI MAC CE in the UL resource provided by a RAR or in the MsgA payload, the UE may not include the CCCH SDU in the same MAC PDU. In this case, the UE may drop the CCCH SDU from the MAC PDU, e.g., via MAC PDU rebuilding. For example, in action 610 of FIG. 6A, the UE may determine to include the C-RNTI MAC CE but not the CCCH data in MsgA. In action 620 of FIG. 6B, the UE may determine to include the C-RNTI MAC CE but not the CCCH data in Msg3.

In some implementations, when the RA procedure is initiated as part of the RA-SDT procedure, the MAC layer may determine whether to include a C-RNTI MAC CE in the Msg3/MsgA payload depending on whether there is a UE identity included in the Msg3/MsgA payload. In some implementations, when an RRC Resume Request message (e.g., considered as CCCH data) is transmitted as part of the RA-SDT procedure, the RRC layer may not include a UE identity in the RRC Resume Request message. The UE identity may be a C-RNTI and/or an I-RNTI.

In some implementations, if the UE includes a C-RNTI MAC CE with CCCH data in the Msg3/MsgA payload, the UE may not need to monitor a PDCCH addressed to a Temporary_C-RNTI while ra-ContentionResolutionTimer is running.

In some implementations, if the UE includes a C-RNTI MAC CE with CCCH data in the Msg3/MsgA payload, the UE may ignore a UE contention resolution identity MAC CE included in a received Msg4/MsgB. The LE may discard the Temporary_C-RNTI.

Condition A1: The 4-Step/2-Step RA Procedure is Initiated as Part of an RA-SDT Procedure.

In some implementations, the 2-step RA procedure may be initiated as part of the RA-SDT procedure if at least one of the following criteria is satisfied:

UL data arrives at an RB/LCH configured for SDT.

The UE is configured with random access resources for a 4-step RA-based SDT procedure and/or RA resources for a 2-step RA-based SDT procedure (at the selected carrier, e.g., NUL or SUL), and the RSRP of the downlink pathloss reference is above a specific threshold for selection between the 4-step RA-based SDT and the 2-step RA-based SDT procedure.

The UE is configured with random access resources for a 2-step RA-based SDT procedure and is not configured with random access resources for a 4-step RA-based SDT procedure (at the selected carrier, e.g., NUL or SUL).

The total size of available small data for transmission is below a specific data volume threshold for the selection between a (CG-based/RA-based) SDT procedure and a non-SDT procedure (e.g., normal RRC connection resume procedure/normal RA procedure). The total size of available small data may be the sum of all the available data from the RB(s)/LCH(s) configured for SDT and/or the sum of payload sizes of all the triggered MAC CEs.

The UE is configured with configurations for a CG-based SDT procedure (e.g., ConfiguredGrantConfig) and the random access resources for an RA-based SDT procedure (at the selected carrier, e.g., NUL or SUL), and the RSRP of the downlink pathloss reference is above a specific threshold for selection between the CG-based SDT procedure and the RA-based SDT procedure.

The UE is not configured with a configuration fir a CG-based SDT procedure and is configured with random access resources for an RA-based SDT procedure (at the selected carrier, e.g., NUL or SUL).

The measured DL RSRP is above a threshold that is used for selecting between an RA procedure as part of an SDT procedure or a normal RA procedure.

The UE does not have a valid CG resource available for transmission in the RRC_INACTIVE state, e.g., the UE is not configured with a CG configuration fix use in the RRC_INACTIVE state and all the CG configurations/resources have been suspended/discarded/released/cleared. Moreover, the UE may suspend/discard/release/clear a CG configuration/resource if timealignmenttimer expires, the DL RSRP change exceeds a configured threshold since the previous TA update, the measured DL RSRP from SSB that corresponds to the CG configuration/resource is below a configured threshold, etc.

In some implementations, the 4-step RA procedure may be initiated as part of the RA-SDT procedure if at least one of the following criteria is satisfied:

UL data arrives at an RB/LCH configured for SDT.

The UE is configured with random access resources for a 4-step RA-based SDT procedure and random access resources for a 2-step RA-based SDT procedure (at the selected carrier, e.g., NUL or SUL), and the RSRP of the downlink pathloss reference is below a specific threshold for selection between the 4-step RA-based SDT procedure and the 2-step RA-based SDT procedure.

The UE is configured with random access resources for a 4-step RA-based SDT procedure and is not configured with random access resources for a 2-step RA-based SDT procedure (at the selected carrier, e.g., NUL or SUL).

The total size of available small data for transmission is below a specific data volume threshold for the selection between a (CG-based/RA-based) SDT procedure and a non-SDT procedure (e.g., normal RRC connection resume procedure/normal RA procedure). The total size of available small data may be the sum of all the available data from the RB(s)/LCH(s) configured for SDT and/or the sum of payload sizes of all the triggered MAC CEs.

The UE is configured with configurations for a CG-based SDT procedure (e.g., ConfiguredGrantConfig) and the random access resources for an RA-based SDT procedure (at the selected carrier, e.g., NUL or SUL), and the RSRP of the downlink pathloss reference is above a specific threshold for selection between CG-based SDT and RA-based SDT.

The UE is not configured with a configuration for a CG-based SDT and is configured with random access resources for an RA-based SDT (at the selected carrier. e.g., NUL or SUL).

The measured DL RSRP is above a threshold that is used for selecting between an RA procedure as part of an SDT procedure or a normal RA procedure.

The UE does not have a valid CG resource available for transmission in the RRC_INACTIVE state, e.g., the UE is not configured with a CG configuration for use in the RRC_INACTIVE state and all the CG configurations/resources have been suspended/discarded/released/cleared. Moreover, the UE may suspend/discard/release/clear a CG configuration/resource if timealignmenttimer expires, the DL RSRP change exceeds a configured threshold since the previous TA update, the measured DL RSRP from SSB that corresponds to the CG configuration/resource is below a configured threshold, etc.

In some implementations, the RB(s)/LCH(s) configured for SDT may be resumed when the UE initiates the (4-step/2-step RA-based) SDT procedure.

In some implementations, the UE may transmit CCCH data after it initiates the (4-step/2-step) RA-based SDT procedure, e.g., via Msg3/MsgA. In this sense, data may be considered available at the CCCH of the UE when it initiates the (4-step/2-step) RA-based SDT procedure. Moreover, the CCCH data may be an RRCResumeRequest/RRCResumeRequest1 message that needs to be transmitted as part of the (4-step/2-step) RA-based SDT procedure.

In one example (of condition A1), after a UE initiates a first 4-step RA procedure, the UE may receive a RAR as part of the first 4-step RA procedure. In some implementations, the UE may include a C-RNTI MAC CE in a UL resource indicated by the RAR if the 4-step RA procedure is initiated as part of a 4-step RA-based SDT procedure. In contrast, the UE may not include a C-RNTI MAC CE in a UL resource indicated by the RAR if the 4-step RA procedure is not initiated as part of a 4-step RA-based SDT procedure.

If the RA-based SDT procedure is initiated, data from a CCCH and RB(s)/LCH(s) configured for SDT may be available for transmission when the UL resource indicated by the RAR becomes available during the RA-based SDT procedure.

If the 4-step RA procedure is initiated as part of the 4-step RA-based SDT procedure, the UE may transmit a Msg1 preamble via a (4-step RA) preamble/PRACH resource specifically configured for SDT.

In one example (of condition A1), after a UE initiates a first 2-step RA procedure, the UE may perform MsgA transmission as part of the first 2-step RA procedure, and the MsgA transmission may include transmission of a MsgA payload. In some implementations, the UE may include a C-RNTI MAC CE in the MsgA payload if the 2-step RA procedure is initiated as part of a 2-step RA-based SDT procedure. In contrast, the UE may not include a C-RNTI MAC CE in the MsgA payload if the 2-step RA procedure is not initiated as part of a 2-step RA-based SDT procedure.

If the RA-based SDT procedure is initiated, data from a CCCH and/or RB(s)/LCH(s) configured for SDT may be available for transmission when the UL resource for MsgA payload transmission becomes available during the RA-based SDT procedure.

If the 2-step RA procedure is initiated as part of the 2-step RA-based SDT procedure, the UE may transmit a MsgA preamble via a (2-step RA) preamble/PRACH resource specifically configured for SDT.

Condition A2: The UE has a Valid C-RNTI.

In some implementations, the UE may be considered as having a valid C-RNTI if the C-RNTI has not been discarded and/or considered invalid. In some implementations, the UE may be considered as having a valid C-RNTI after the UE initiates an RA procedure within a CG-SDT procedure. The reason is that after a CG-SDT procedure is initiated by the UE, a valid C-RNTI may be used for monitoring on PDCCH during the CG-SDT procedure for the scheduling of UL/DL resource for subsequent data transmission after the UE transmits a first UL transmission on CG PUSCH in the CG-SDT procedure. The C-RNTI may be discarded and/or considered invalid if at least one of the following criteria is satisfied:

A specific timer expires. The specific timer may be a T_response. The specific timer may be a configuredGrantTimer or a cg-RetransmissionTimer, T319, SDT failure detection timer, etc. The specific timer may be a time alignment timer that is used by the UE while in the RRC_INACTIVE state.

The UE does not have a valid TA.

The CG resource and/or the RA resource configured for the UE has been cleared/released/suspended.

The UE performs state transition from the RRC_INACTIVE state to the RRC_IDLE state (after receiving CN paging message).

The UE moves to a RAT/cell that is different from the RAT/cell where the C-RNTI is provided.

The UE performs cell (re)selection procedure.

RLF occurs. e.g., due to detection of an RA problem, the number of RLC retransmissions reaching a configured value, etc.

SDT failure/problem is detected.

A fallback indication is received by the UE.

After the UE performs a new UL transmission on a CG PUSCH (e.g., a PUSCH that corresponds to a CG configuration) as part of the CG-based SDT, the UE may monitor on a specific PDCCH in order to receive scheduling of uplink/downlink resource for subsequent data transmission. The network may also transmit a (scheduling of) fallback indication to the UE on the specific PDCCH during the subsequent data transmission phase. Upon receiving the (scheduling of) fallback indication, the UE may discard the C-RNTI and/or initiate an RA-based SDT/non-SDT procedure (e.g., normal RRC connection resume procedure/normal RA procedure).

After the UE successfully completes the RA procedure as part of the RA-based SDT, the UTE may monitor on a specific PDCCH in order to receive scheduling of uplink/downlink resource for subsequent data transmission. The network may also transmit a (scheduling of) fallback indication to the UE on the specific PDCCH during the subsequent data transmission phase. Upon receiving the (scheduling of) fallback indication, the UTE may discard the C-RNTI and/or initiate an RA-based SDT/non-SDT procedure (e.g., normal RRC connection resume procedure/normal RA procedure).

At least one of the fallback criteria is satisfied:

If the number of preamble/MsgA payload/Msg3 transmissions exceeds a configured maximum number of times during an RA-based SDT, the UE may discard the C-RNTI and/or initiate a normal RA procedure. In some implementations, the RA-based SDT and/or the normal RA procedure may be the same as the first RA procedure. In some other implementations, the RA-based SDT and/or the normal RA procedure may be different from the first RA procedure.

If the number of CG transmissions exceeds a configured maximum number of times during a CG-based SDT, the UE may discard the C-RNTI and/or initiate a normal RA procedure. The normal RA procedure may be different from or the same as the first RA procedure.

In some implementations, the UE may obtain and/or may be configured with a valid C-RNTI for use in the RRC_INACTIVE state using at least one of the following methods.

Method #1: C-RNTI may not be released/discarded and/or may be stored in AS (inactive) context when the UE transitions from the RRC_CONNECTED state to the RRC_INACTIVE state during an RRC connection release procedure if at least one of the following criteria is satisfied.

The (suspendConfig of the) RRCRelease message, which is received by the UE during the RRC connection release procedure, may include a specific IE/configuration. The specific IE/configuration may be a configuredGrantConfig, a configuration of one or multiple RBs/LCHs for SDT, etc. The specific IE/configuration may be an SDT configuration. The specific IE/configuration may be an RA configuration for SDT.

In some implementations, a specific indication/flag may be used to indicate whether the UE should release, discard, and/or store the C-RNTI when the UE transitions from the RRC_CONNECTED state to the RRC_INACTIVE state. More specifically, the specific indication/flag may be included in (suspendConfig of the) RRCRelease message, configuredGrantConfig, a configuration of one or multiple RBs/LCHs for SDT, an SDT configuration, an RA configuration for SDT, and/or system information.

The C-RNTI may be applied as part of a UE AS (inactive) context.

Method #2: C-RNTI for using in the RRC_INACTIVE state may be configured by the network in a specific message.

The specific message may be Msg4/MsgB as part of an RA-based SDT/normal RA procedure. The specific message may be received on a PDSCH scheduled by a specific PDCCH for monitoring the scheduling of UL/DL resource for subsequent data transmission. The specific PDCCH may be monitored by the UE during an RA-based/CG-based SDT. The specific message may be an RRCRelease message, and the RRCRelease message may be received by the UE during an RRC release/resume procedure.

The RRC release procedure may be used to transition the UE from the RRC_CONNECTED state to the RRC_INACTIVE state.

The RRC connection resume procedure may be initiated by the UE due to arrival of data at RB(s)/LCH(s) configured for SDT while the UE is in the RRC_INACTIVE state, e.g., when the criteria for performing an RA-based SDT or a CG-based SDT is satisfied.

The C-RNTI may be configured in the ConfiguredGrantConfig IE in the RRCRelease message.

The C-RNTI may be configured in the suspendConfig IE in the RRCRelease message.

The C-RNTI may be configured in an RA configuration for SDT.

The C-RNTI may be configured in an SDT configuration.

Method #3: C-RNTI for use in the RRC_INACTIVE state may be derived from a Temporary_C-RNTI received by the UE.

The Temporary_C-RNTI may be received in MsgB/Msg2 of a second RA procedure. The UE may set the value of C-RNTI to the value of the received Temporary_C-RNTI after the second RA procedure is successfully completed. The second RA procedure may be an RA-based SDT/normal RA procedure. The second RA procedure may be different from the first RA procedure.

In one example (of condition A2), after a UE initiates a first 4-step RA procedure, the UE may receive a RAR as part of the first 4-step RA procedure. The UE may include a C-RNTI MAC CE in a UL resource indicated by the RAR if the UE has a valid C-RNTI (e.g., after initiating the 4-step RA procedure during a CG-SDT procedure). In some implementations, the UE may include a C-RNTI MAC CE in Msg3, which may be transmitted on a UL resource indicated by the RAR, if the 4-step RA procedure is initiated during a CG-SDT procedure. In one example, the UE may initiate a CG-SDT procedure. Moreover, after the UE transmits a first UL transmission on CG PUSCH in the CG-SDT procedure, the UE may have a valid C-RNTI for monitoring on PDCCH during the CG-SDT procedure for the scheduling of UL/DL resource for subsequent data transmission. Hence, if the UE initiates a 4-step RA procedure during the CG-SDT procedure (after performing the first UL transmission on CG PUSCH in the CG-SDT procedure), the UE may include a C-RNTI MAC CE in a UL resource indicated by RAR, which is received as part of the 4-step RA procedure. In contrast, the UE may not include a C-RNTI MAC CE in a UL resource indicated by the RAR if the UE does not have a valid C-RNTI (e.g., the UE has not been configured with a valid C-RNTI or the C-RNTI has been discarded).

The UE may determine whether it has a valid C-RNTI when the UL resource indicated by the RAR becomes available. The UE may determine that it has a valid C-RNTI if the UE has been configured with a C-RNTI which has not been discarded (based on the abovementioned criteria). The UE may determine that it does not have a valid C-RNTI if the UE has not been configured with a C-RNTI (based on the abovementioned methods) and/or the UE's C-RNTI has been discarded (based on the abovementioned criteria).

In one example (of condition A2), after a UE initiates a first 2-step RA procedure, the UE may perform a MsgA transmission as part of the first 2-step RA procedure, and the MsgA transmission may include transmission of a MsgA payload. The UE may include a C-RNTI MAC CE in the MsgA payload if the UE has a valid C-RNTI (e.g., after initiating the 2-step RA procedure during a CG-SDT procedure). In some implementations, the UE may include a C-RNTI MAC CE in the MsgA payload if the 2-step RA procedure is initiated during a CG-SDT procedure. In one example, the UE may initiate a CG-SDT procedure. Moreover, after the UE transmits a first UL transmission on CG PUSCH in the CG-SDT procedure, the UE may have a valid C-RNTI for monitoring on PDCCH during the CG-SDT procedure for the scheduling of UL/DL resource for subsequent data transmission. Hence, if the UE initiates a 2-step RA procedure during the CG-SDT procedure (after performing the first UL transmission on CG PUSCH in the CG-SDT procedure), the UE may include a C-RNTI MAC CE in a MsgA payload, which is transmitted as part of the 2-step RA procedure. In contrast, the UE may not include a C-RNTI MAC CE in the MsgA payload if the UE does not have a valid C-RNTI (e.g., the C-RNTI has been discarded).

The UE may determine whether it has a valid C-RNTI when the UL resource for a MsgA payload transmission becomes available. The UE may determine that it has a valid C-RNTI if the UE has been configured with a C-RNTI which has not been discarded (based on the abovementioned criteria). The UE may determine that is does not have a valid C-RNTI if the UE has not been configured with a C-RNTI (based on the abovementioned methods) and/or the UE's C-RNTI has been discarded (based on the abovementioned criteria).

Condition A3: The Payload Size/TBS of the MsgA Payload/Msg3 is Sufficient.

In some implementations, the UE may consider whether the payload size/TBS of MsgA payload/Msg3 is large enough to accommodate both the C-RNTI MAC CE and the CCCH SDU. To achieve this, the LCP priority of C-RNTI MAC CE may be lower than a CCCH SDU. As such, the UE may determine whether to multiplex a C-RNTI MAC CE to a MAC PDU that includes a CCCH SDU based on whether the payload size/TBS of the MsgA payload/Msg3 is large enough to transmit the MAC PDU.

Condition A4: The UE Still has Remaining UL Data for Transmission after Transmitting a MsgA Payload or Msg3.

In some implementations, the remaining UL data available for transmission may be from an LCH/RB configured for SDT.

In some implementations, the UE may determine that it has remaining UL data available for transmission after the MsgA payload transmission or Msg3 transmission if the UE includes a BSR MAC CE in a MsgA payload transmission or a Msg3 transmission. Moreover, the transmitted BSR MAC CE may include a buffer size field of non-zero (for at least one LCG).

In some implementations, the UE may determine that it has remaining UL data available for transmission after the MsgA payload transmission or the Msg3 transmission if the UE includes either a short BSR MAC CE or long/short truncated BSR in the MsgA payload transmission or the Msg3 transmission.

In some implementations, when a UE initiates a 4-step RA procedure (as part of an RA-based SDT procedure), the UE may check whether the RA procedure is initiated for the CCCH LCH (e.g., the UE has CCCH data available for transmission) and whether the total available CCCH data (e.g., CCCH SDU) plus MAC CE (e.g., including MAC CE subheader and MAC CE payload) is greater than ra-Msg3SizeGroupA configured for the UE (specifically for an RA procedure initiated as part of an RA-based SDT procedure). If all the conditions are satisfied, the UE may transmit a 4-step RA preamble corresponding to group B during the 4-step RA procedure. Otherwise, the UE may transmit a 4-step RA preamble corresponding to group A during the 4-step RA procedure.

In some implementations, when a UE initiates a 2-step RA procedure (as part of an RA-based SDT procedure), the UE may check whether the RA procedure is initiated for the CCCH LCH (e.g., the UE has CCCH data available for transmission) and whether the total available CCCH data (e.g., CCCH SDU) plus MAC CE (e.g., including MAC CE subheader and MAC CE payload) is greater than ra-MsgA-SizeGoupA configured for the UE (specifically for a 2-step RA procedure initiated as part of an RA-based SDT procedure). If all the conditions are satisfied, the UE may transmit a 2-step RA preamble corresponding to group B during the 2-step RA procedure. Otherwise, the UE may transmit a 2-step RA preamble corresponding to group A during the 2-step RA procedure.

UE Monitoring Behavior During an RA Procedure

In one scenario, a UE in the RRC_INACTIVE state may perform an RRC connection resume procedure. The RRC connection resume procedure may include transmission of an RRCResumeRequest/RRCResumeRequest1 message to the network on a UL resource scheduled by a RAR (e.g., Msg3) or a UL resource for MsgA payload transmission. Based on the abovementioned assumption in the present disclosure, the UE may have a valid C-RNTI (or I-RNTI) in the RRC_INACTIVE state. Hence, the UE may include its identity (e.g., I-RNTI, C-RNTI, etc.) in the RRCResumeRequest/RRCResumeRequest1 message in the UL resource scheduled by a RAR (e.g., Msg3) or the UL resource for MsgA payload transmission. Moreover, the UE may not include a C-RNTI MAC CE in the UL resource scheduled by a RAR (e.g., Msg3) or the UL resource for MsgA payload transmission.

Based on the scenario above, an RA procedure defined in 3GPP TS 38.321 V16.2.0 may be modified to change a UE's PDCCH monitoring behavior for contention resolution/MsgB/RAR, with an aim to allow the UE to monitor a PDCCH transmission associated with C-RNTI for Msg4/MsgB.

In some implementations, even if a C-RNTI MAC CE is not transmitted on a UL resource for MsgA payload transmission and/or CCCH data (e.g., the data of RRCResumeRequest/RRCResumeRequest1 message) is transmitted on a UL resource for MsgA payload transmission, the UE may conditionally monitor the PDCCH of a RAR identified by C-RNTI while the msgB-ResponseWindow is running. The detailed implementation is disclosed below.

In some implementations, even if a C-RNTI MAC CE is not transmitted on a UL resource scheduled by a RAR (e.g., Msg3) and/or CCCH data (e.g., the data of RRCResumeRequest/RRCResumeRequest1 message) is transmitted on a UL resource scheduled by a RAR (e.g., Msg3), the UE may conditionally monitor the PDCCH of a RAR identified by C-RNTI while ra-ContentionResolutionTimer is running. The detailed implementation is disclosed below.

In some implementations, a UE may initiate a 2-step RA procedure, which includes transmission of MsgA and reception of MsgB. In the present implementation, MsgA may include a MsgA preamble and a MsgA payload. The MsgA payload may include CCCH data. The MsgA may not include a C-RNTI MAC CE. After transmitting the MsgA preamble, the UE may (re)start a msgB-ResponseWindow. Moreover, while the msgB-ResponseWindow is running, the UE may (be expected to) monitor a PDCCH of the SpCell for a RAR identified by the C-RNTI if at least one of the following conditions (e.g., from condition B1 through condition B4, as described in greater detail below) is satisfied.

FIG. 7A is a flowchart 700A illustrating a method for conditionally monitoring a PDCCH of a RAR identified by a C-RNTI in a 2-step RA procedure, according to an example implementation of the present disclosure. In action 702, the UE may initiate a 2-step RA procedure. In action 704, the UE may transmit a MsgA preamble that does not include C-RNTI MAC CE. The UE may start msgB-ResponseWindow. In action 706, the UE may determine that at least one of condition B1 through condition B4 (described below) is satisfied. In action 708, the UE may monitor the PDCCH of a RAR identified by the C-RNTI while the msgB-ResponseWindow is running. In action 710, the UE may receive a PDCCH addressed to the C-RNTI. In action 712, the UE may consider the RA procedure as successfully completed.

While the msgB-ResponseWindow is running, the UE may not (be expected to) monitor PDCCH of the SpCell for a RAR identified by the C-RNTI if at least one of the following conditions (e.g., from condition B1 through condition B4, described below) is not satisfied. Moreover, the UE may only (be expected to) monitor PDCCH of the SpCell for a RAR identified by the MsgB-RNTI if at least one of the following conditions (e.g., from condition B1 through condition B4, described below) is not satisfied.

If at least one of the following conditions (e.g., from condition B1 through condition B4, described below) is satisfied, and the UE successfully receives a RAR identified by the C-RNTI while the msgB-ResponseWindow is running, the UE may consider the RAR reception successful. The UE may also consider the RA procedure successfully completed.

If at least one of the following conditions (e.g., from condition B1 through condition B4, described below) is not satisfied, and UE successfully receives a RAR identified by the C-RNTI while the msgB-ResponseWindow is running, the UE may not consider the RAR reception successful. The UE may consider the RA procedure as unsuccessfully completed.

If at least one of the following conditions (e.g., from condition B1 through condition B4, described below) is satisfied, the UE may not monitor on the PDCCH/CORESET/SS that schedules MsgB associated with MsgB-RNTI while the msgB-ResponseWindow is running. For example, the UE may not attempt to detect a DCI format 1_0 with CRC scrambled by MsgB-RNTI at a PDCCH for Type1-PDCCH CSS set while the msgB-ResponseWindow is running.

If at least one of the following conditions (e.g., from condition B1 through condition B4, described below) is satisfied, the UE may monitor on the PDCCH/CORESET/SS that schedules a RAR associated with C-RNTI while the msgB-ResponseWindow is running. For example, while the msgB-ResponseWindow is running, the UE may attempt to detect a DC associated with C-RNTI at a (UE-specific/common) CORESET. Here, the CORESET may be configured in an RRC Release message and/or broadcast system information (e.g., SIB) for monitoring a dynamic scheduling of a UL/DL resource during a (RA-based/CG-based) SDT procedure.

In some implementations, a UE may initiate a 4-step RA procedure, which includes transmission of Msg3 (e.g., a UL resource indicated by a RAR) and reception of Msg4 (e.g., contention resolution). In the present implementation, Msg3 may include CCCH data. Msg3 may not include a C-RNTI MAC CE. After transmitting Msg3, the UE may (re)start a ra-ContentionResolutionTimer. While the ra-ContentionResolutionTimer is running, the UE may (be expected to) receive a PDCCH transmission addressed to C-RNTI on the SpCell if at least one of the following conditions (e.g., from condition B1 through condition B4, described below) is satisfied.

Figure 7B:
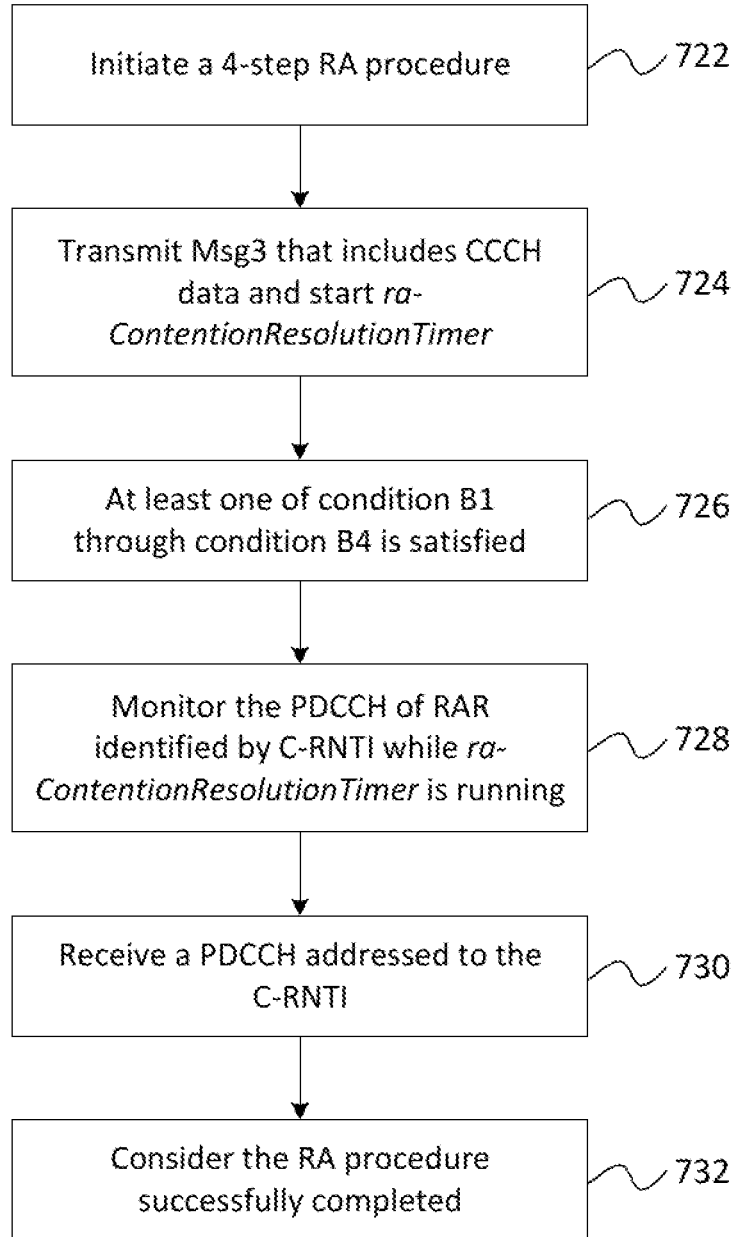
FIG. 7B is a flowchart illustrating a method for conditionally monitoring a PDCCH of a RAR identified by a C-RNTI in a 4-step RA procedure, according to an example implementation of the present disclosure.

FIG. 7B is a flowchart 700B illustrating a method for conditionally monitoring a PDCCH of a RAR identified by a C-RNTI in a 4-step RA procedure, according to an example implementation of the present disclosure. In action 722, the UE may initiate a 4-step RA procedure. In action 724, the UE may transmit Msg3 that includes CCCH data. The UE may start ra-ContentionResolutionTimer. In action 726, the UE may determine that at least one of condition B1 through condition B4 (described below) is satisfied. In action 728, the UE may monitor the PDCCH of a RAR identified by the C-RNTI while the ra-ContentionResolutionTimer is running. In action 730, the UE may receive a PDCCH addressed to the C-RNTI. In action 732, the UE may consider the RA procedure as successfully completed.

While the ra-ContentionResolutionTimer is running, the UE may not (be expected to) receive a PDCCH transmission addressed to the C-RNTI on the SpCell if at least one of the following conditions (e.g., from condition B1 through condition B4, described below) is not satisfied. Moreover, the UE may only (be expected to) monitor PDCCH of the SpCell for a RAR identified by the Temporary_C-RNTI if at least one of the following conditions (e.g., from condition B1 through condition B4, described below) is not satisfied.

If at least one of the following conditions (e.g., from condition B1 through condition B4, described below) is satisfied, and the UE successfully receives a PDCCH transmission addressed to the C-RNTI while the ra-ContentionResolutionTimer is running, the UE may consider the contention resolution successful. The UE may also consider the RA procedure successfully completed.

If at least one of the following conditions (e.g., from condition B1 through condition B4, described below) is not satisfied, and the UE successfully receives a PDCCH transmission addressed to the C-RNTI while the ra-ContentionResolutionTimer is running, the UE may not consider the contention resolution successful. The UE may consider the RA procedure unsuccessfully completed.

If at least one of the following conditions (e.g., from condition B1 through condition B4, described below) is satisfied, the UE may not monitor on the PDCCH/CORESET/SS that schedules Msg4 associated with a Temporary_C-RNTI while the ra-ContentionResolutionTimer is running. For example, the UE may not attempt to detect a DCI format 1_0 with CRC scrambled by a Temporary_C-

RNTI at a PDCCH for USS and/or PDCCH for a Type1-PDCCH CSS set while the ra-ContentionResolutionTimer is running.

If at least one of the following conditions (e.g., from condition B1 through condition B4, described below) is satisfied, the UE may monitor on the PDCCH/CORESET/ SS that schedules a RAR associated with C-RNTI while the ra-ContentionResolutionTimer is running. For example, while the ra-ContentionResolutionTimer is running, the UE may attempt to detect a DC associated with a C-RNTI at a (UE-specific/common) CORESET. Here, the CORESET may be configured in an RRC Release message and/or broadcast system information (e.g., SIB) for monitoring a dynamic scheduling of UL/DL resource during a (RA-based/ CG-based) SDT procedure.

Condition B1: The First 4-Step/2-Step RA Procedure is Initiated as Part of an RA-Based SDT Procedure.

In some implementations, the 4-step RA procedure may be initiated as part of the RA-based SDT procedure if at least one of the criteria defined above is satisfied.

In some implementations, the 2-step RA procedure may be initiated as part of the RA-based SDT procedure if at least one of the criteria defined above is satisfied.

Condition B2: The UE has a Valid C-RNTI.

In some implementations, the UE may be considered as having a valid C-RNTI if the C-RNTI has not been discarded. The C-RNTI may be discarded if at least one of the criteria to discard a C-RNTI (as defined above) is satisfied.

In some implementations, the UE may obtain and/or may be configured with a valid C-RNTI for use in the RRC_I-NACTIVE state based on at least one of the methods defined in the present disclosure.

Condition B3: The UE has Included its Identity in the CCCH Data in the MsgA Payload/Msg3.

In some implementations, the identity may include at least one of the following: a UE-specific RNTI (e.g., I-RNTI, C-RNTI, CS-RNTI, etc.).

In some implementations, the CCCH data may be an RRCResumeRequest/RRCResumeRequest1 message. The transmission of RRCResumeRequest/RRCResumeRequest) message may be performed as part of an RA-based SDT procedure.

Condition B4: The UE has Transmitted a BSR MAC CE in the MsgA Payload/Msg3.

In some implementations, the BSR may be triggered due to arrival of UL data from an LCH/RB configured for SDT.

In some implementations, the BSR MAC CE may be included in the MsgA payload/Msg3 when the UE has a triggered and uncancelled BSR MAC CE when the MsgA payload/Msg3 becomes available for transmission.

In some implementations, the transmitted BSR MAC CE may include a buffer size field of non-zero (for at least one LCG) to indicate that the UE has remaining data available after transmitting the MsgA payload/Msg3.

In some implementations, the transmitted BSR MAC CE may be a short BSR MAC CE or a long/short truncated BSR.

In some implementations, a UE may initiate a 2-step RA procedure, which includes transmission of MsgA and reception of MsgB. In the present example. MsgA may include a MsgA preamble and a MsgA payload. The MsgA payload may include CCCH data. The MsgA payload may not include a C-RNTI MAC CE. After transmitting the MsgA preamble, the UE may (re)start a msgB-ResponseWindow. Moreover, while the msgB-ResponseWindow is running, the UE may (be expected to) monitor PDCCH of the SpCell for a RAR identified by the C-RNTI if the 2-step RA procedure is initiated as part of an RA-based SDT procedure, the UE has a valid C-RNTI, the UE has included a BSR MAC CE in the MsgA payload, and/or the UE has included its identity in the CCCH data in the MsgA payload.

In some implementations, while the msgB-ResponseWindow is running, the UE may not (be expected to) monitor PDCCH of the SpCell for a RAR identified by the C-RNTI if the 2-step RA procedure is not initiated as part of an RA-based SDT procedure (e.g., the 2-step RA procedure is determined as a normal RA procedure), the UE does not have a valid C-RNTI, the UE has not included a BSR MAC CE in the MsgA payload, and/or the UE has not included its identity in the CCCH data in the MsgA payload. In the present case, the UE may only (be expected to) monitor a PDCCH of the SpCell for a RAR identified by the MsgB-RNTI if the 2-step RA procedure is not part of an RA-based SDT procedure.

In some implementations, the 2-step RA procedure may be initiated as part of an RA-based SDT procedure, the UE may have a valid C-RNTI, the UE may have included a BSR MAC CE in the MsgA payload, and/or the UE may have included its identity in the CCCH data in the MsgA payload. In the present case, if the UE successfully receives a RAR identified by the C-RNTI while the msgB-ResponseWindow is running, the UE may consider the RAR reception successful. The UE may also consider the RA procedure successfully completed.

In some implementations, the 2-step RA procedure may not be initiated as part of an RA-based SDT procedure, the UE may not have a valid C-RNTI, the UE may not have included a BSR MAC CE in the MsgA payload, and/or the UE may not have included its identity in the CCCH data in the MsgA payload. In the present case, if the UE successfully receives a RAR identified by the C-RNTI while the msgB-ResponseWindow is running, the UE may not consider the RAR reception successful. The UE may consider the RA procedure as unsuccessfully completed.

In some implementations, a UE may initiate a 4-step RA procedure, which includes transmission of Msg3 (e.g., a UL resource indicated by a RAR) and reception of Msg4 (e.g., contention resolution). In the present example, Msg3 may include CCCH data and/or may not include a C-RNTI MAC CE. After transmitting Msg3, the UE may (re)start a ra-ContentionResolutionTimer. While the ra-ContentionResolutionTimer is running, the UE may (be expected to) receive a PDCCH transmission addressed to C-RNTI on the SpCell if the 4-step RA procedure is initiated as part of an RA-based SDT procedure, the UE has a valid C-RNTI, the UE has included a BSR MAC CE in Msg3, and/or the UE has included its identity in the CCCH data in Msg3.

In some implementations, while the ra-ContentionResolutionTimer is running, the UE may not (be expected to) receive a PDCCH transmission addressed to a C-RNTI on the SpCell if the 4-step RA procedure is not initiated as part of an RA-based SDT procedure (e.g., the 4-step RA procedure is determined as a normal RA procedure), the UE does not have a valid C-RNTI, the UE has not included a BSR MAC CE in Msg3, and/or the UE has not included its identity in the CCCH data in Msg3. In the present case, the UE may only be (be expected to) monitor a PDCCH of the SpCell for a RAR identified by the Temporary_C-RNTI if the 4-step RA procedure is not initiated as part of an RA-based SDT procedure.

In some implementations, the 4-step RA procedure may be initiated as part of an RA-based SDT procedure, the UE may have a valid C-RNTI, the UE may have included a BSR MAC CE in Msg3, and/or the UE may have included its identity in the CCCH data in Msg3. In the present case, if the UE successfully receives a PDCCH transmission addressed to a C-RNTI while the ra-ContentionResolutionTimer is running, the UE may consider the contention resolution successful. The UE may also consider the RA procedure successfully completed.

In some implementations, the 4-step RA procedure may not be initiated as part of an RA-based SDT procedure (e.g., the 4-step RA procedure is determined as a normal RA procedure), the UE may not have a valid C-RNTI, the UE may not have included a BSR MAC CE in Msg3, and/or the UE may not have included its identity in the CCCH data in Msg3. In the present case, if the UE successfully receives a PDCCH transmission addressed to a C-RNTI while the ra-ContentionResolutionTimer is running, the UE may not consider the contention resolution successful. The UE may consider the RA procedure unsuccessfully completed.

Figure 8:
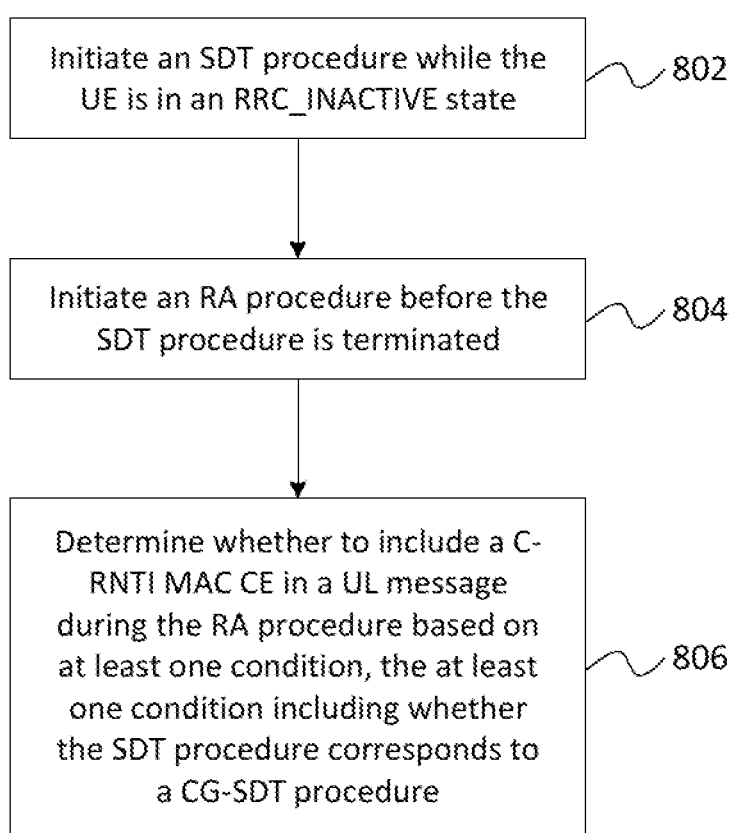
FIG. 8 is a flowchart illustrating a method/process performed by a UE for SDT, according to an example implementation of the present disclosure.

FIG. 8 is a flowchart 800 illustrating a method/process performed by a UE for SDT, according to an example implementation of the present disclosure. In action 802, the UE may initiate an SDT procedure while the UE is in an RRC_INACTIVE state. In action 804, the UE may initiate an RA procedure before the SDT procedure is terminated. The RA procedure may be an RA procedure within a CG-SDT procedure (as illustrated in FIG. 2) or an RA procedure within an RA-SDT procedure (as illustrated in FIG. 3). In action 806, the UE may determine whether to include a C-RNTI MAC CE in a UL message during the RA procedure based on at least one condition. The at least one condition includes whether the SDT procedure corresponds to a CG-SDT procedure. The UL message is Msg3 in a case that the RA procedure is a 4-step RA procedure. The UL message is MsgA in a case that the RA procedure is a 2-step RA procedure.

In some implementations, the UE may determine to include the C-RNTI MAC CE in the UL message in a case that the SDT procedure corresponds to the CG-SDT procedure. In some implementations. CCCH data is not allowed to be included in the UL message in a case that the SDT procedure corresponds to the CG-SDT procedure. The CCCH data may correspond to an RRC Resume Request message.

Referring to CG-SDT illustrated in FIG. 2, UE 202 may perform initial CG transmission in action 218. The initial CG transmission may include transmission of the CCCH data, which may correspond to an RRC Resume Request message. By transmitting the CCCH data, UE 202 may notify NW 204 of the beginning of the CG-SDT procedure. Since the CCCH data has been sent to NW 204 in action 218, resources can be saved by not including the CCCH data in the UL message during the RA procedure initiated within the CG-SDT procedure. In addition, by including the C-RNTI MAC CE in the UL message during the RA procedure initiated within the CG-SDT procedure, UE 202 is able to let NW 204 recognize which UE is performing the RA procedure.

In some implementations, the UE may determine to include the CCCH data in the UL message in a case that the SDT procedure corresponds to an RA-SDT procedure. In some implementations, the C-RNTI MAC CE is not allowed to be included in the UL message in a case that the SDT procedure corresponds to the RA-SDT procedure. The CCCH data may correspond to an RRC Resume Request message.

In some implementations, the at least one condition may further include: whether the UE has a valid C-RNTI before initiating the RA procedure; whether the RA procedure is initiated after an initial CG transmission of the CG-SDT procedure; whether the RA procedure is initiated in a subsequent transmission phase of the CG-SDT procedure; and whether the RA procedure is not initiated for transmission of small data. The initial CG transmission of the CG-SDT procedure may refer to action 218 of FIG. 2. The subsequent transmission phase of the CG-SDT procedure may refer to action 220 of FIG. 2.

In some implementations, the C-RNTI MAC CE is included in the UL message in a case that at least one of the at least one condition is satisfied. In some implementations, CCCH data is not allowed to be included in the UL message in a case that at least one of the at least one condition is satisfied, where the CCCH data may correspond to an RRC Resume Request message.

Further Elaboration

In some implementations, a normal RA procedure may be referred to as an RRC connection resume procedure/RA procedure that is not initiated for transmitting small data (in the RRC_INACTIVE state). In another word, a normal RA procedure may be referred to as an RA procedure other than an RA-based SDT. When a normal RA procedure is initiated by a UE, the UE selects an RA preamble without small data indication (e.g., the value of the RA preamble and/or the PRACH resource used for transmitting the RA preamble may not indicate to the network that the normal RA procedure is for SDT purposes.

In some implementations, a normal RRC connection resume procedure may be referred to as an RRC connection resume procedure that is not initiated due to the conditions for perform CG-based/RA-based SDT being satisfied.

In some implementations, for a CG-based SDT procedure, a subsequent data transmission phase may begin after a UE transmits an RRCResumeRequest message on a CG PUSCH (e.g., a PUSCH that corresponds to a CG configuration) for SDT (e.g., action 218 of FIG. 2). During the subsequent data transmission phase, the UE may monitor on a PDCCH for receiving scheduling information of UL/DL resources for subsequent data transmission. Moreover, the subsequent data transmission phase may be terminated when the CG-based SDT procedure is completed, e.g., after the UE receives an RRCRelease message from the network (e.g., action 222 of FIG. 2 錯誤 ?! 找不到參照 來源。).

In some implementations, for an RA-based SDT procedure, a subsequent data transmission phase may begin when the RA procedure within the RA-based SDT procedure is successfully completed, e.g., when the contention resolution is successful for a 4-step RA-based SDT procedure or when the random access response reception is successful for a 2-step RA-based SDT procedure (e.g., action 316 of FIG. 3). During the subsequent data transmission phase, the UE may monitor on a PDCCH for receiving scheduling information of Ul/DL resources for subsequent data transmission. Moreover, the subsequent data transmission phase may be terminated when the RA-based SDT procedure is completed. e.g., after the UE receives an RRCRelease message from the network (e.g., action 320 of FIG. 3).

In some implementations, an SDT failure detection timer may be started by a UE upon initiation of a CG-based/RA-based SDT procedure. Upon expiration of the SDT failure detection timer, the same procedure as T319 expiry according to 3GPP TS 38.331 V16.2.0 may be performed by the UE. Moreover, the legacy T319 stopping conditions may also be applied as the stopping conditions of the SDT failure detection timer.

Upon expiration of the SDT failure detection timer, the UE may transition to the RRC_IDLE state and perform actions upon going to the RRC_IDLE state.

The stopping conditions of the SDT failure detection timer may be satisfied upon reception of RRCResume, RRCSetup, RRCRelease, RRCRelease with suspendConfig or RRCReject message, cell re-selection and upon abortion of connection establishment by upper layers.

In some implementations, a CG configuration may correspond to one or more DL-SSBs (e.g., periodically occurring). Specifically, a UE may measure the one or more DL-SSBs at the occasions where the DL-SSBs may occur. Specifically, a UE may measure the one or more DL-SSBs only when it needs to perform SDT on the CG configuration that corresponds to the one or more DL-SSBs.

In some implementations, a DL-SSB configuration may include one or multiple DL-SSBs. Moreover, each of the one or multiple DL-SSBs may be mapped to a (subset) of CG configurations.

In some implementations, the implementations in the present disclosure may be applied to a UE in the RRC_INACTIVE state only. A UE in the RRC_CONNECTED state may or may not apply the implementations disclosed in the present disclosure.

In some implementations, a UE may be configured with one or multiple DL-SSB configurations. Each DL-SSB configuration may be associated with a DL-SSB configuration ID.

In some implementations, an RB may be referred to as an SRB and/or a DRB.

In some implementations, a DCI (e.g., a transmission on a PDCCH) associated with/corresponding to an RNTI may be equivalent to the DCI (e.g., the transmission on a PDCCH) with CRC scrambled by the RNTI.

In some implementations, a CORESET may be referred to as a PDCCH/SS in the present disclosure.

In some implementations, the timealignmentimer mentioned in the present disclosure may be valid when a UE is in the RRC_INACTIVE state. The timealignmenttimer may be (re)started upon a UE entering the RRC_INACTIVE state.

In some implementations, the timealignmenttimer may be (re)started when the UE receives an RRCRelease message (with suspendConfig). In one alternative, the RRCRelease message may include the configuration of the timealignmenttimer.

T_Response

In some implementations, T_response may be used to define a period during which a UE may monitor on a specific PDCCH/CORESET/SS for a specific response from the network.

In some implementations, a UE may monitor on a specific PDCCH/CORESET/SS for possible transmission(s) of specific response(s) while T_response is running. On the other hand, if T_response is not running (e.g., stopped or expired), the UE may not monitor on a specific PDCCH/CORESET/SS for possible transmission(s) of specific response(s).

In some implementations, T_response may be equivalent to the configuredGrantTimer; cg-RetransmissionTimer, SDT failure detection timer, etc.

Configuration of T_Response

In some implementations, T_response may be configured per DL-SSB configuration, per CG configuration, per BWP, per carrier, per UE, and/or per RA configuration.

In some implementations, T_response may be configured, by the network, via broadcast system information (e.g., SIB) and/or dedicated RRC signaling.

In some implementations, T_response may be preconfigured in the UE (e.g., specified in 3GPP TS).

In some implementations, T_-response may be configured in (suspendConfig IE in) an RRCRelease message.

In some implementations, T_response may have a unit of symbols, slots, subframes, frames, milliseconds, seconds, multiples of periodicity of a CG configuration, multiples of periodicity of DL-SSBs, etc.

Starting or Restarting Conditions of T_Response

In some implementations, T_response (of a HARQ process/CG configuration/DL-SSB ID) may be (re)started (at an offset) after the UE transmits on a UL resource (that corresponds to the HARQ process/CG configuration/DL-SSB ID).

In some implementations, T_response (of an RA configuration) may be (re)started (at an offset) after (successful) completion of an RA procedure. Here, the RA procedure may be initiated as part of an RA-based SDT procedure.

In some implementations, the UE may be expected to receive a specific response from the network after transmission on a UL resource and/or after an RA procedure is successfully completed. The specific response may be DCI-based, MAC CE-based, and/or RRC message-based. The UL resource may be referred to as a PUSCH resource scheduled by a dynamic grant and/or a CG resource.

In some implementations, T_response (of a HARQ process/CG configuration/DL-SSB ID) may be (re)started (at an offset) after the UE receives a specific response indicating ACK/NACK/fallback (for the corresponding HARQ process/CG configuration/DL-SSB ID). The specific response may be DCI-based, MAC CE-based, and/or RRC message-based.

In some implementations, the UE may, upon reception of a dynamic grant for scheduling a PUSCH resource, which is used for retransmission of a TB that was transmitted on a UL resource, (re)start T_response (for the HARQ process of the transmitted UL resource). The dynamic grant, which is used to schedule a PUSCH resource for retransmission, may be considered as a specific response indicating NACK. T_response (for the HARQ process of the transmitted UL resource) may be (re)started at an offset after receiving the dynamic grant.

In some implementations, the offset may be predefined in the UE or may be configured by the network. Moreover, the period may have a unit of symbols, slots, subframes, frames, milliseconds, seconds, multiples of periodicity of a CG configuration, multiples of periodicity of DL-SSBs, etc.

Stopping Conditions of T_Response

In some implementations. T_response may be stopped when a (CG-based/RA-based) SDT procedure is completed/stopped/terminated.

In some implementations, T_response (of a HARQ process/CG configuration/DL-SSB ID) may be stopped when a specific response indicating ACK/NACK/fallback is received (for the corresponding HARQ process/CG configuration/DL-SSB ID). The specific response may be DCI-based, MAC CE-based, and/or RRC message-based.

In some implementations, a UE may transmit a UL resource (of a HARQ process/CG configuration/DL-SSB ID) and start T_response (for the HARQ process/CG configuration/DL-SSB ID). Subsequently, the UE may, upon reception of a dynamic grant (e.g., DCI) scheduling a PUSCH resource for new transmission, stop T_response (for the HARQ process/CG configuration/DL-SSB ID of the transmitted UL resource). Note that the dynamic grant, which is used to schedule a PUSCH resource for new transmission, may be considered as a specific response indicating (HARQ) ACK in the present example. T_response (for the HARQ process/CG configuration/DL-SSB ID of the transmitted UL resource) may be (re)started at an offset after receiving the dynamic grant. The UE may determine that the dynamic grant (e.g., DCI) is for scheduling a PUSCH resource for new transmission if the dynamic grant (e.g., DCI) is associated with a C-RNTI. The UE may determine that the dynamic grant (e.g., DCI) is for scheduling a PUSCH resource for new transmission if the NDI field of the dynamic grant (e.g., DCI) is toggled when compared with the NDI of the previous dynamic grant with the same HARQ process ID. The UL resource may be referred to as a PUSCH resource scheduled by a dynamic grant and/or a CG resource.

In some implementations, a UE may transmit a UL resource (for a HARQ process/CG configuration/DL-SSB ID) and start T_response (for the HARQ process/CG configuration/DL-SSB ID). Moreover, an RRCResumeRequest message may be transmitted on the UL resource. Subsequently, the UE may, upon reception of an RRCRelease message with suspendConfig IE, stop T_response (for the HARQ process/CG configuration/DL-SSB ID of the transmitted UL resource). The RRCRelease message with suspendConfig IE may be considered as a specific response indicating ACK. The UL resource may be referred to as a PUSCH resource scheduled by a dynamic grant and/or a CG resource.

In some implementations, T_response (for a HARQ process/CG configuration/DL-SSB ID) may be stopped when the next CG resource for initial transmission (for the HARQ process/CG configuration/DL-SSB ID) becomes available for transmission. Alternatively, T_response configured by the network may be shorter than the periodicity of a CG configuration.

In some implementations. T_response may be stopped when a CG configuration is reconfigured (e.g., periodicity) by the network. The network may reconfigure the CG configuration using an RRCRelease message. For example, the network may include a CG configuration with a new set of parameters (e.g., periodicity) in the suspendConfig IE of the RRCRelease message. In some implementations, only the T_response configured in the CG configuration may be stopped.

In some implementations. T_response may be stopped when a CG configuration is released/discarded/suspended. In some implementations, only the T_response configured in the CG configuration may be stopped. In some implementations, only the T_response configured in the DL-SSB corresponding to the CG configuration may be stopped.

In some implementations, T_response may be stopped when a DL-SSB configuration is reconfigured/released/discarded. The network may reconfigure the DL-SSB configuration via an RRCRelease message. For example, the network may include a DL-SSB configuration with a new set of parameters in the suspendConfig IE of the RRCRelease message. In some implementations, only the T_response configured in the DL-SSB configuration may be stopped. In some implementations, only the T_response configured in the CG configuration that corresponds to the DL-SSB configuration may be stopped.

In some implementations. T_response may be stopped when a UE performs BWP switching from an old (UL/DL) BWP to a new (UU/DL) BWP. Note that this may be under the assumption that a UE in the RRC_INACTIVE state is configured with more than one BWPs. The old BWP may be an initial/dedicated BWP and the new BWP may be a dedicated/initial BWP. When the UE switches from an old BWP to a new BWP, the UE deactivates the old BWP and activates the new BWP. In some implementations, only the T_response configured in the old BWP may be stopped. In some implementations, only the T_response configured in the CG/DL-SSB configuration from the old BWP may be stopped.

In some implementations, T_response may be stopped when an RA procedure is initiated. The RA procedure may be a 2-step RA or a 4-step RA. The RA procedure may be initiated as part of an RA-based SDT procedure. The RA procedure may be initiated as part of a CG-based SDT procedure. The RA procedure may be initiated due to the reception of a (valid) fallback indication.

Definition of SS

The Search Space (SS), mentioned in the present disclosure, may be one or more of the following options:

Option 1: Common Search Space. Examples may include: common search space(s) configured in PDCCH-ConfigCommon, the type-1 PDCCH CSS set configured by ra-SearchSpace, the type-3 PDCCH CSS set, search space zero, a new common Search Space set configured via system information (e.g., SIB) or an RRC release message, and search space with parameters of the search space(s) configured in the initial BWP.

Option 2: UE-specific Search Space set. Examples may include: a UE-specific Search Space set configured via an RRC Release message, a UE-specific Search Space set configured via Msg4/MsgB, a UE-specific search space set configured via PDCCH-Config, a UE-specific search space set configured via configuration(s) for SDT, a search space with ID other than 0-39, a search space set identified as a specific set for SDT.

The CORESET, mentioned in the present disclosure, may be one or more of the following options:

Option 1: common CORESET. Examples may include: CORESET 0, and a CORESET other than CORESET 0.

Option 2: UE-specific CORESET configuration. Examples may include: a UE-specific CORESET configured via an RRC Release message, a UE-specific CORESET configured via Msg4/MsgB, a UE-specific CORESET configured via configuration(s) for SDT, a CORESET with ID other than 0-14.

RRC Resume Request Message

The RRC Resume Request message may be used to request the resumption of a suspended RRC connection or perform an RNA update. The RRC Resume Request message may be transmitted on a CCCH via SRB0. Table 1 below illustrates a data structure of the RRC Resume Request message, according to an example implementation of the present disclosure.

TABLE 1

```
-- ASN1START
-- TAG-RRCRESUMEREQUEST-START
RRCResumeRequest ::=              SEQUENCE {
    RRCResumeRequest                   RRCResumeRequest-IEs
}
RRCResumeRequest-IEs ::=          SEQUENCE {
    resumeIdentity                     ShortI-RNTI-Value,
    resumeMAC-I                        BIT STRING (SIZE (16)),
    resumeCause                        ResumeCause,
    spare                              BIT STRING (SIZE (1))
}
-- TAG-RRCRESUMEREQUEST-STOP
-- ASN1STOP
```

Figure 9:
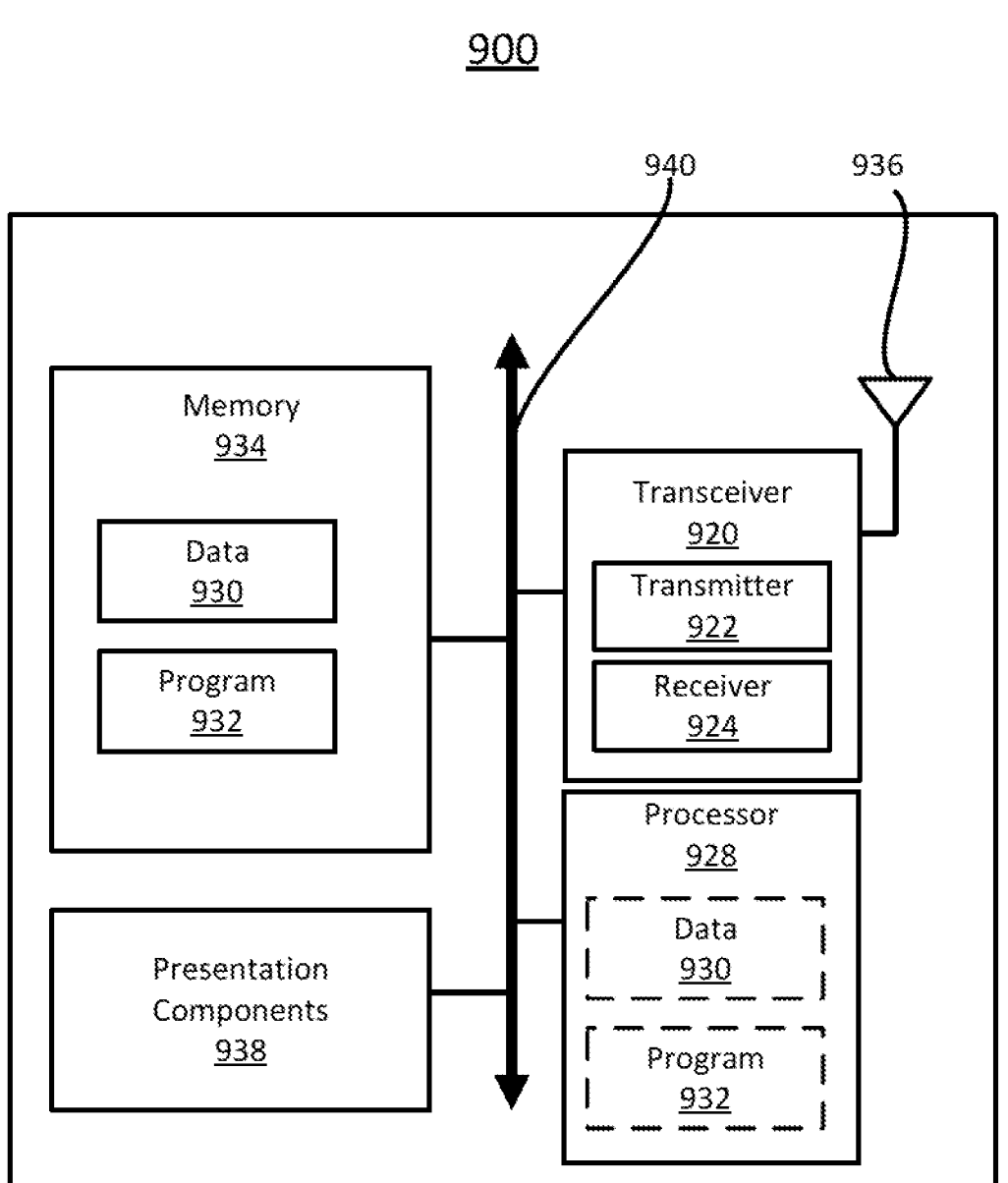
FIG. 9 is a block diagram illustrating a node for wireless communication, according to an example implementation of the present disclosure.

FIG. 9 is a block diagram illustrating a node 900 for wireless communication in accordance with various aspects of the present disclosure. As illustrated in FIG. 9, a node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 1 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including but not limited to usable, non-usable and flexibly usable subframes and slot formats. The transceiver 920 may be configured to receive data and control channels.

The node 900 may include a variety of computer-readable media. Computer-readable media may be any available media that may be accessed by the node 900 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store a computer-readable and/or computer-executable program 932 (e.g., software codes) that are configured to, when executed, cause the processor 928 to perform various functions disclosed herein, for example, with reference to FIGS. 1 through 8. Alternatively, the program 932 may not be directly executable by the processor 928 but may be configured to cause the node 900 (e.g., when compiled and executed) to perform various functions disclosed herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the program 932 received from the memory 934, and information transmitted and received via the transceiver 920, the baseband communications module, and/or the network communications module. The processor 928 may also process information to send to the transceiver 920 for transmission via the antenna 936 to the network communications module for transmission to a CN.

One or more presentation components 938 may present data indications to a person or another device. Examples of presentation components 938 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for small data transmission (SDT), the method comprising:
    initiating an SDT procedure while the UE is in a Radio Resource Control (RRC) Inactive (RRC_INACTIVE) state;
    initiating a random access (RA) procedure due to data arrival at a common control channel (CCCH), wherein the RA procedure is initiated before the SDT procedure is terminated; and
    including a Cell-Radio Network Temporary Identifier (C-RNTI) Medium Access Control (MAC) Control Element (CE) in an uplink (UL) message during the RA procedure in response to determining that the UE has a valid C-RNTI before initiating the RA procedure, wherein:
        determining that the UE has a valid C-RNTI comprises determining that the UE has the valid C-RNTI in response to determining that the UE has not discarded the valid C-RNTI,
        the UL message is a message 3 (Msg3) in a case that the RA procedure is a 4-step RA procedure, and
        the UL message is a message A (MsgA) in a case that the RA procedure is a 2-step RA procedure.

2. The method of claim 1, wherein the UE discards the valid C-RNTI in response to determining that a specific timer has expired.

3. The method of claim 1, wherein the UE discards the valid C-RNTI in response to receiving a core network (CN) paging message indicating a state transitioning from the RRC_INACTIVE state to an RRC_IDLE state.

4. The method of claim 1, further comprising forgoing including the C-RNTI MAC CE in the UL message in response to determining that the UE has not discarded the valid C-RNTI before initiating the RA procedure.

5. The method of claim 4, wherein the CCCH data is included in the UL message when the C-RNTI MAC CE is not included in the UL message.

6. The method of claim 1, wherein the UE discards the valid C-RNTI in response to detecting an SDT failure.

7. The method of claim 1, wherein the UE discards the valid C-RNTI in response to receiving, from a base station, an indication to discard the valid C-RNTI.

8. The method of claim 1, wherein the CCCH data is not allowed to be included in the UL message in response to including the C-RNTI MAC CE in the UL message.

9. A user equipment (UE) for small data transmission (SDT), the UE comprising:

at least one processor; and at least one non-transitory computer-readable medium coupled to the at least one processor and storing one or more computer-executable instructions that, when executed by the at least one processor, cause the UE to:

initiate an SDT procedure while the UE is in a Radio Resource Control (RRC) Inactive (RRC_INACTIVE) state;

initiate a random access (RA) procedure due to data arrival at a common control channel (CCCH), wherein the RA procedure is initiated before the SDT procedure is terminated; and include a Cell-Radio Network Temporary Identifier (C-RNTI) Medium Access Control (MAC) Control Element (CE) in an uplink (UL) message during the RA procedure in response to determining that the UE has a valid C-RNTI before initiating the RA procedure, wherein:

determining that the UE has a valid C-RNTI comprises determining that the UE has the valid C-RNTI in response to determining that the UE has not discarded the valid C-RNTI, the UL message is a message 3 (Msg3) in a case that the RA procedure is a 4-step RA procedure, and the UL message is a message A (MsgA) in a case that the RA procedure is a 2-step RA procedure.

10. The UE of claim 9, wherein the UE discards the valid C-RNTI in response to determining that a specific timer has expired.

11. The UE of claim 9, wherein the UE discards the valid C-RNTI in response to receiving a core network (CN) paging message indicating a state transitioning from the RRC_INACTIVE state to an RRC_IDLE state.

12. The UE of claim 9, further comprising forgoing including the C-RNTI MAC CE in the UL message in response to determining that the UE has not discarded the valid C-RNTI before initiating the RA procedure.

13. The UE of claim 12, wherein the CCCH data is included in the UL message when the C-RNTI MAC CE is not included in the UL message.

14. The UE of claim 9, wherein the UE discards the valid C-RNTI in response to detecting an SDT failure.

15. The UE of claim 9, wherein the UE discards the valid C-RNTI in response to receiving, from a base station, an indication to discard the valid C-RNTI.

16. The UE of claim 9, wherein the CCCH data is not allowed to be included in the UL message in response to including the C-RNTI MAC CE in the UL message.

* * * * *